US011405903B2

(12) United States Patent
Choi et al.

(10) Patent No.: US 11,405,903 B2
(45) Date of Patent: Aug. 2, 2022

(54) DEVICE AND METHOD FOR TRANSMITTING UPLINK CONTROL CHANNEL IN WIRELESS COMMUNICATION SYSTEM

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

( * ) Notice: Subject to any disclaimer, the term of this patent is extended or adjusted under 35 U.S.C. 154(b) by 0 days.

(21) Appl. No.: 17/371,082

(22) Filed: Jul. 8, 2021

(65) Prior Publication Data
US 2021/0352656 A1    Nov. 11, 2021

Related U.S. Application Data

(63) Continuation of application No. PCT/KR2020/000430, filed on Jan. 9, 2020.

(30) Foreign Application Priority Data

Jan. 9, 2019  (KR) .................. 10-2019-0003012
Apr. 1, 2019  (KR) .................. 10-2019-0038071

(51) Int. Cl.
*H04B 7/216*   (2006.01)
*H04W 72/04*   (2009.01)
*H04L 1/18*    (2006.01)

(52) U.S. Cl.
CPC ....... *H04W 72/0413* (2013.01); *H04L 1/1812* (2013.01); *H04W 72/0466* (2013.01)

(58) Field of Classification Search
CPC .......... H04W 72/0413; H04W 72/0466; H04L 1/1812
See application file for complete search history.

(56) References Cited

U.S. PATENT DOCUMENTS

2018/0098345 A1*  4/2018  Tiirola ................. H04L 1/1861
2021/0218539 A1*  7/2021  Hu ....................... H04L 1/1861

FOREIGN PATENT DOCUMENTS

KR   10-2018-0031014     3/2018
WO   2019/217881        11/2019
(Continued)

OTHER PUBLICATIONS

International Search Report for PCT/KR2020/000430 dated Apr. 22, 2020 and its English translation from WIPO (now published as WO 2020/145704).

(Continued)

*Primary Examiner* — Bo Hui A Zhu
(74) *Attorney, Agent, or Firm* — Ladas & Parry, LLP

(57) ABSTRACT

The present specification relates to a device and method for transmitting an uplink control channel in a wireless communication system. Disclosed in the present specification is a method for transmitting a physical uplink control channel by means of a UE, the method including: a step for generating a first HARQ-ACK codebook related to a first PUCCH; a step for generating a second HARQ-ACK codebook related to a second PUCCH; and a step for transmitting simultaneously the first PUCCH and the second PUCCH or one PUCCH among the first PUCCH and the second PUCCH to a base station in one slot on the basis of a plurality of indicators. According to the present embodiments, the sequence for transmitting a plurality of PUCCHs including respectively different HARQ-ACKs in one slot is clarified, and thus the targeted performance of a 5G wireless (Continued)

communication system intended to simultaneously provide various types of traffic (eURLLC, eMBB) can be achieved.

20 Claims, 24 Drawing Sheets

(56) References Cited

FOREIGN PATENT DOCUMENTS

| WO | 2020/027579 | 2/2020 |
|---|---|---|
| WO | 2020/145355 | 7/2020 |
| WO | 2020/145356 | 7/2020 |
| WO | 2020/145357 | 7/2020 |
| WO | 2020/145704 | 7/2020 |

OTHER PUBLICATIONS

Written Opinion of the International Searching Authority for PCT/KR2020/000430 dated Apr. 22, 2020 and its English translation by Google Translate (now published as WO 2020/145704).
Huawei et al: "LI enhancements for URLLC", R1-1810157, 3GPP TSG RAN WG1 Meeting #94bis, Chengdu, China, Oct. 8-12, 2018, pp. 10-11; and figure 8.
Nokia et al.: "On UCI Enhancements for URLLC", R1-1813114, 3GPP TSG RAN WG1 Meeting #95, Spokane, WA, USA, Nov. 12-16, 2018, pp. 1-3.
Mediatek Inc.: "Enhancements on HARQ for NR-U operation", R1-1812358, 3GPP TSG RAN WG1 Meeting #95, Spokane, WA, USA, Nov. 12-16, 2018, pp. 3-5; and figures 3(a)-3(c).
ZTE: "UL control enhancements for URLLC", R1-1812385, 3GPP TSG RAN WG1 Meeting #95, Spokane, USA, Nov. 12-16, 2018, pp. 2-3; and figure 1.
International Preliminary Report on Patentability (Chapter I) dated Jun. 16, 2021 for PCT/KR2020/000430 and its English translation from WIPO (now published as WO 2020/145704).
Extended European Search Report dated Feb. 1, 2022 for European Patent Application No. 20738798.6.
MediaTek Inc.: "Remaining issues of short-PUCCH", 3GPP TSG RAN WG1 Meeting #93, R1-1806799, Busan, Korea, May 21-25, 2018, pp. 1-5.
Office Action dated Apr. 28, 2022 for Indian Patent Application No. 202127032806.

* cited by examiner

FIG.20
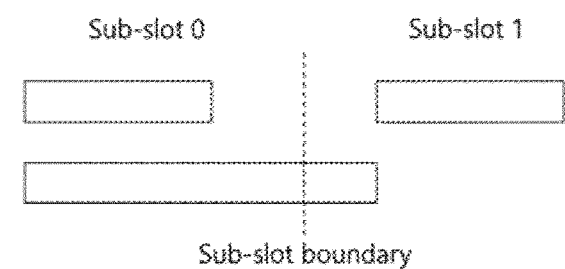
Sub-slot boundary
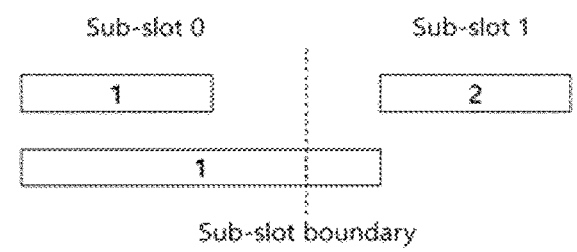
Sub-slot boundary
New rule: 2 bits

DEVICE AND METHOD FOR TRANSMITTING UPLINK CONTROL CHANNEL IN WIRELESS COMMUNICATION SYSTEM

CROSS-REFERENCE TO RELATED APPLICATIONS

The present application is a continuation of International Patent Application No. PCT/KR2020/000430 filed on Jan. 9, 2020, which claims the priority to Korean Patent Application No. 10-2019-0003012 filed in the Korean Intellectual Office on Jan. 9, 2019, and Korean Patent Application No. 10-2019-0038071 filed in the Korean Intellectual Office on Apr. 1, 2019, the entire contents of which are incorporated herein by reference.

TECHNICAL FIELD

The present disclosure relates to wireless communication and, more particularly, to a device and method for transmitting an uplink control channel in a wireless communication system, a device and method for receiving an uplink control channel in a wireless communication system, and a device and method for controlling a downlink for the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

A future 5G technology requires lower latency data transmission due to the advent of a new application, such as real-time control and tactile Internet, and the 5G data request latency is expected to be lowered down to 1 ms. 5G aims to provide approximately 10 times lower data latency than before. In order to solve this problem, it is expected that a communication system using a mini-slot having a shorter TTI period (e.g., 0.2 ms), in addition to the existing slot (or subframe), will be proposed for 5G.

In relation to an enhanced ultra-reliable low latency communication (URLLC) that is being developed in 3GPP release 16, various technologies for providing lower latency and higher reliability are being discussed. In order to provide a lower latency time, transmission of an uplink control channel including two or more pieces of HARQ-ACK in one slot is supported. A UE may secure a lower latency time by enabling HARQ-ACK transmission as quickly as possible in response to successful reception of a downlink shared channel. In particular, when multiple PUCCHs for multiple HARQ-ACK transmissions exist in one slot, a procedure for transmitting a PUCCH and HARQ-ACK timing should be newly defined.

DISCLOSURE OF INVENTION

Technical Problem

A technical task of the present disclosure is to provide a device and method for transmitting an uplink control channel in a wireless communication system, a device and method for receiving an uplink control channel in a wireless communication system, and a device and method for controlling a downlink for the same.

Another technical task of the present disclosure is to provide a method for transferring downlink control information for multiple PUCCH transmissions and a method for determining HARQ-ACK information included in PUCCHs.

Another technical task of the present disclosure is to provide a device and method for solving, by indicating multiple PUCCHs via which different pieces of HARQ-ACK are transmitted, collision of the multiple PUCCHs.

Another technical task of the present disclosure is to provide a method for transmitting a PDSCH group indicator indicating multiple PUCCHs, via which different pieces of HARQ-ACK are transmitted, to a UE by a base station.

Another technical task of the present disclosure is to provide a method for defining k1, which indicates HARQ-ACK timing, in a unit smaller than a slot.

Another technical task of the present disclosure is to provide a method for transmitting an HARQ-ACK multiplexing indicator, which indicates whether HARQ-ACK is multiplexed, to a UE by a base station.

Solution to Problem

An aspect of the present disclosure provides a method for transmitting a physical uplink control channel (PUCCH) to a base station by a UE in a wireless communication system. The method includes: generating a first HARQ-ACK codebook associated with a first PUCCH; generating a second HARQ-ACK codebook associated with a second PUCCH; and transmitting simultaneously the first PUCCH and the second PUCCH to the base station in one slot, or transmitting one PUCCH among the first PUCCH and the second PUCCH to the base station.

Here, the first PUCCH and the second PUCCH may correspond to a first indicator and a second indicator, which have different values, respectively, and the one PUCCH may be determined to be the first PUCCH or the second PUCCH on the basis of the first and second indicators.

In an aspect, if the first PUCCH corresponds to the first indicator having a value of 0, the second PUCCH corresponds to the second indicator having a value of 1, and if the first PUCCH corresponds to the first indicator having a value of 1, the second PUCCH corresponds to the second indicator having a value of 0.

In another aspect, the method may further include receiving the first indicator corresponding to the first PUCCH and the second indicator corresponding to the second PUCCH from the base station via a physical downlink control channel or radio resource control (RRC) signaling.

In another aspect, the first HARQ-ACK codebook may be generated in a semi-static scheme, and the second HARQ-ACK codebook may be generated in a dynamic scheme.

In another aspect, the transmitting simultaneously of the first PUCCH and the second PUCCH to the base station in one slot may be performed in a case where transmission of the first PUCCH and transmission of the second PUCCH do not collide, and the transmitting of one PUCCH among the first PUCCH and the second PUCCH may be performed in a case where transmission of the first PUCCH and transmission of the second PUCCH collide, wherein the case where transmission of the first PUCCH and transmission of the second PUCCH collide includes a case where a resource for the first PUCCH and a resource for the second PUCCH at least partially overlap.

In another aspect, the transmitting of one PUCCH among the first PUCCH and the second PUCCH may further include multiplexing the first HARQ-ACK codebook and the second HARQ-ACK codebook, and mapping the multiplexed first and second HARQ-ACK codebooks to the one PUCCH.

In another aspect, the method may further include receiving at least one physical downlink shared channel (PDSCH) associated with the first PUCCH or the second PUCCH in a slot preceding the one slot, wherein an interval between reception timing of the PDSCH and transmission timing of the PUCCH including an HARQ-ACK codebook associated with the at least one PDSCH is defined in units of the number (=b) of symbols less than the number (=a) of symbols constituting the one slot or the preceding slot.

In another aspect, b is half of a.

In another aspect, each of the one slot and the preceding slot may include multiple sub-slots, and the HARQ-ACK codebook associated with the at least one PDSCH may include the same number of pieces of HARQ-ACK as the maximum number of PDSCHs receivable in the preceding slot.

In another aspect, the method may further include receiving a semi-persistently scheduled PDSCH in a slot preceding the one slot, wherein: if HARQ-ACK associated with the semi-persistently scheduled PDSCH cannot be transmitted after k1 slots from the preceding slot, transmission timing of a PUCCH including the HARQ-ACK associated with the semi-persistently scheduled PDSCH is postponed until the one slot; and the k1 is an interval between reception timing of the semi-persistently scheduled PDSCH and transmission timing of the PUCCH including the HARQ-ACK associated with the PDSCH.

In another aspect, the method may further include receiving a transmission period of the semi-statically scheduled PDSCH from the base station, wherein an interval between the one slot and a slot after k1 slots from the preceding slot is determined to be a multiple of the transmission period.

An aspect of the present disclosure provides a method for receiving a physical uplink control channel (PUCCH) from a UE by a base station in a wireless communication system. The method includes: transmitting a first physical downlink shared channel (PDSCH) and a second PDSCH to the UE in a first slot; and receiving simultaneously a first PUCCH including a first HARQ-ACK codebook associated with the first PDSCH and a second PUCCH including a second HARQ-ACK codebook associated with the second PDSCH from the UE in a second slot, or receiving one PUCCH among the first PUCCH and the second PUCCH from the UE.

Here, the first PUCCH and the second PUCCH may correspond to a first indicator and a second indicator, which have different values, respectively, and the one PUCCH may be determined to be the first PUCCH or the second PUCCH on the basis of the first indicator and the second indicator.

In an aspect, if the first PUCCH corresponds to the first indicator having a value of 0, the second PUCCH may correspond to the second indicator having a value of 1, and if the first PUCCH corresponds to the first indicator having a value of 1, the second PUCCH may correspond to the second indicator having a value of 0.

In another aspect, the method may further include transmitting the first indicator corresponding to the first PUCCH and the second indicator corresponding to the second PUCCH to the UE via a physical downlink control channel (PDCCH) or radio resource control (RRC) signaling.

In another aspect, the first HARQ-ACK codebook may be generated in a semi-static scheme, and the second HARQ-ACK codebook may be generated in a dynamic scheme.

In another aspect, the receiving simultaneously of the first PUCCH and the second PUCCH from the UE in the second slot may be performed in a case where transmission of the first PUCCH and transmission of the second PUCCH do not collide, and the receiving of one PUCCH among the first PUCCH and the second PUCCH may be performed in a case where transmission of the first PUCCH and transmission of the second PUCCH collide, wherein the case where transmission of the first PUCCH and transmission of the second PUCCH collide includes a case where a resource for the first PUCCH and a resource for the second PUCCH at least partially overlap.

In another aspect, the receiving of one PUCCH among the first PUCCH and the second PUCCH may further include demultiplexing the one PUCCH so as to acquire the first HARQ-ACK codebook and the second HARQ-ACK codebook.

In another aspect, an interval between transmission timing of the first and second PDSCHs and reception timing of the first and second PUCCHs may be defined in units of the number (=b) of symbols less than the number (=a) of symbols constituting the first slot or the second slot.

In another aspect, the first slot may include each of multiple sub-slots, and an HARQ-ACK codebook associated with the first PDSCH may include the same number of pieces of HARQ-ACK as the maximum number of PDSCHs receivable in the first slot.

In another aspect, the first PDSCH is a semi-persistently scheduled PDSCH, and a transmission period associated with the first PDSCH may be configured by the base station; an interval between the first slot and the second slot may be k1; if the first PUCCH cannot be transmitted in the second slot, transmission timing of the first PUCCH may be postponed until a third slot; and the k1 may be an interval between reception timing of the first PDSCH and transmission timing of the first PUCCH.

Advantageous Effects of Invention

According to the present embodiments, a procedure of transmitting multiple PUCCHs, which include different pieces of HARQ-ACK respectively, in one slot is clarified, and thus the targeted performance of a 5G wireless communication system intended to concurrently provide various types of traffic (eURLLC and eMBB) can be achieved.

The effects obtainable in the present disclosure are not limited to the above-mentioned effects, and other effects not mentioned will be clearly understood by those of ordinary skill in the art from the following description.

BRIEF DESCRIPTION OF DRAWINGS

FIG. 20 illustrates a result of generating the semi-static HARQ-ACK codebook according to FIG. 19;

BEST MODE FOR CARRYING OUT THE INVENTION

Figure 1:
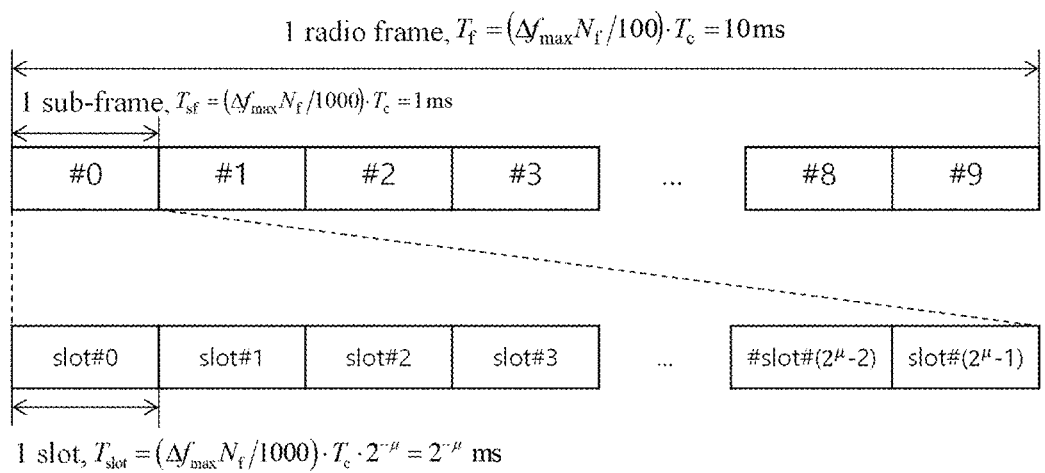
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $Tc=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and p can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
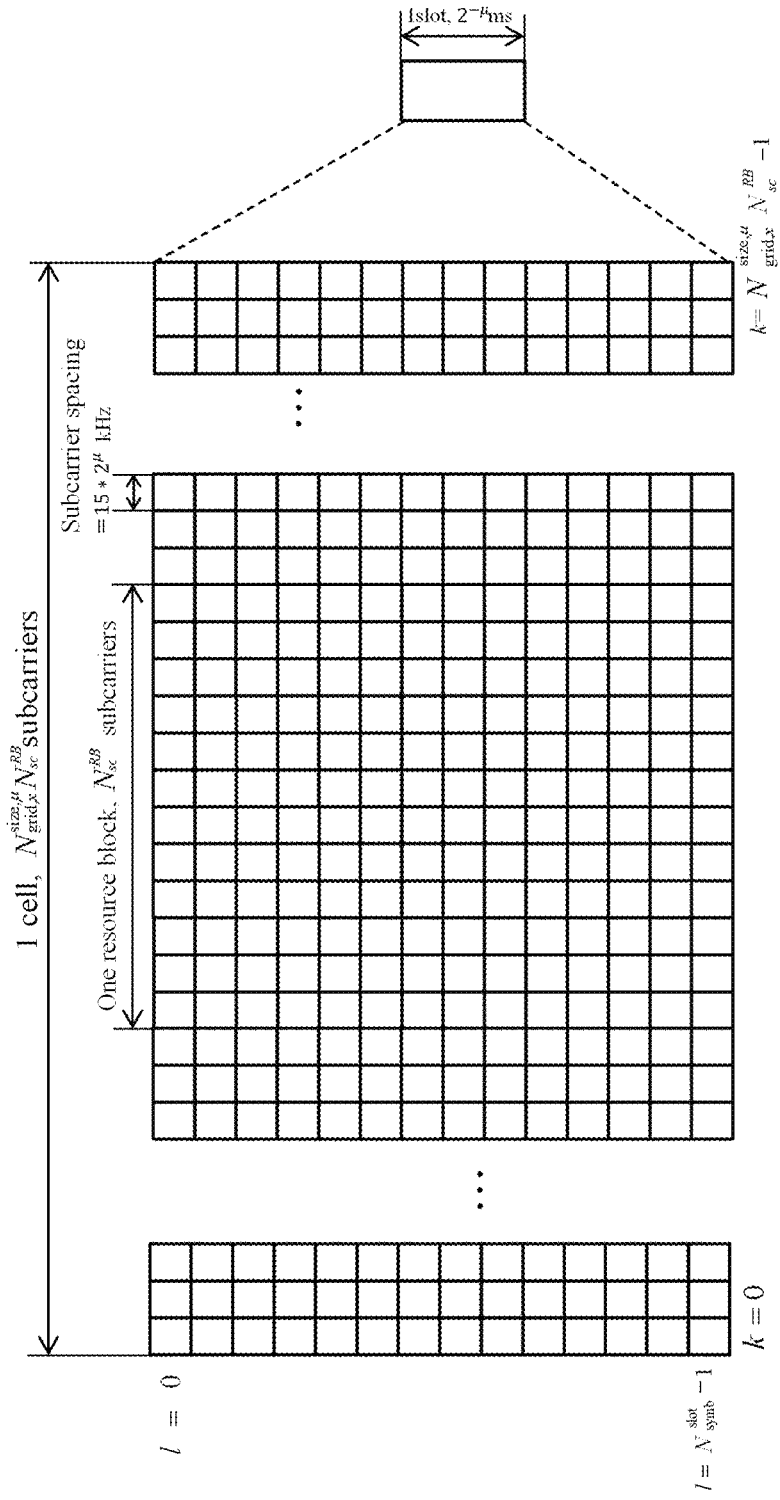
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size, \mu}_{grid, x}*N^{RB}_{sc}$ subcarriers, and $N^{slot}_{symb}$ OFDM symbols. Here, x=DL when the signal is a DL signal, and x=UL when the signal is an UL signal. $N^{size, \mu}_{grid, x}$ represents the number of resource blocks (RBs) according to the subcarrier spacing constituent μ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size, \mu}_{grid, x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot k may be an index assigned from 0 to $N^{size, \mu}_{grid, x} * N^{Rb}_{sc} - 1$ in the frequency domain, and l may be an index assigned from 0 to $N^{slot}_{symb} - 1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
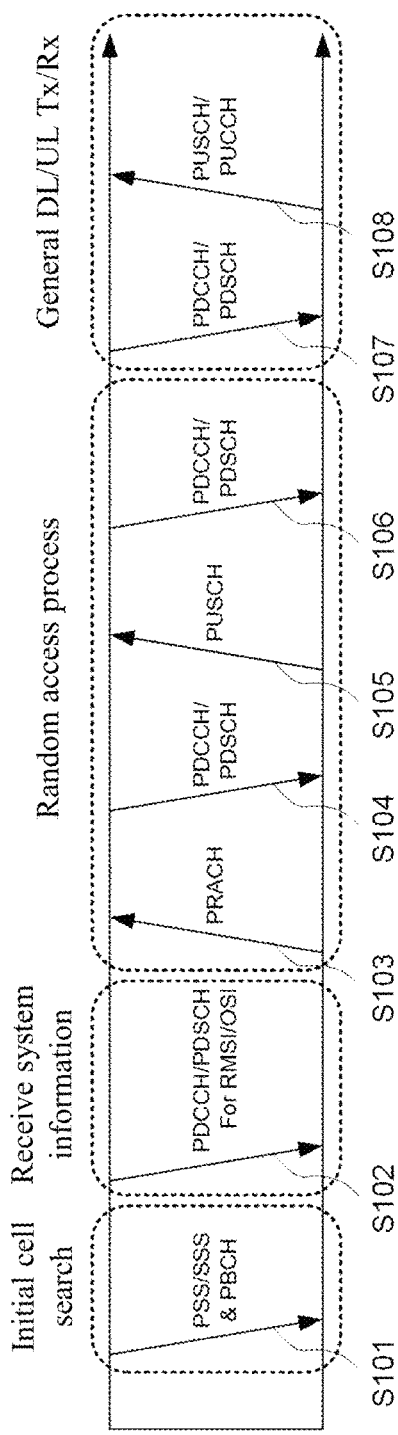
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
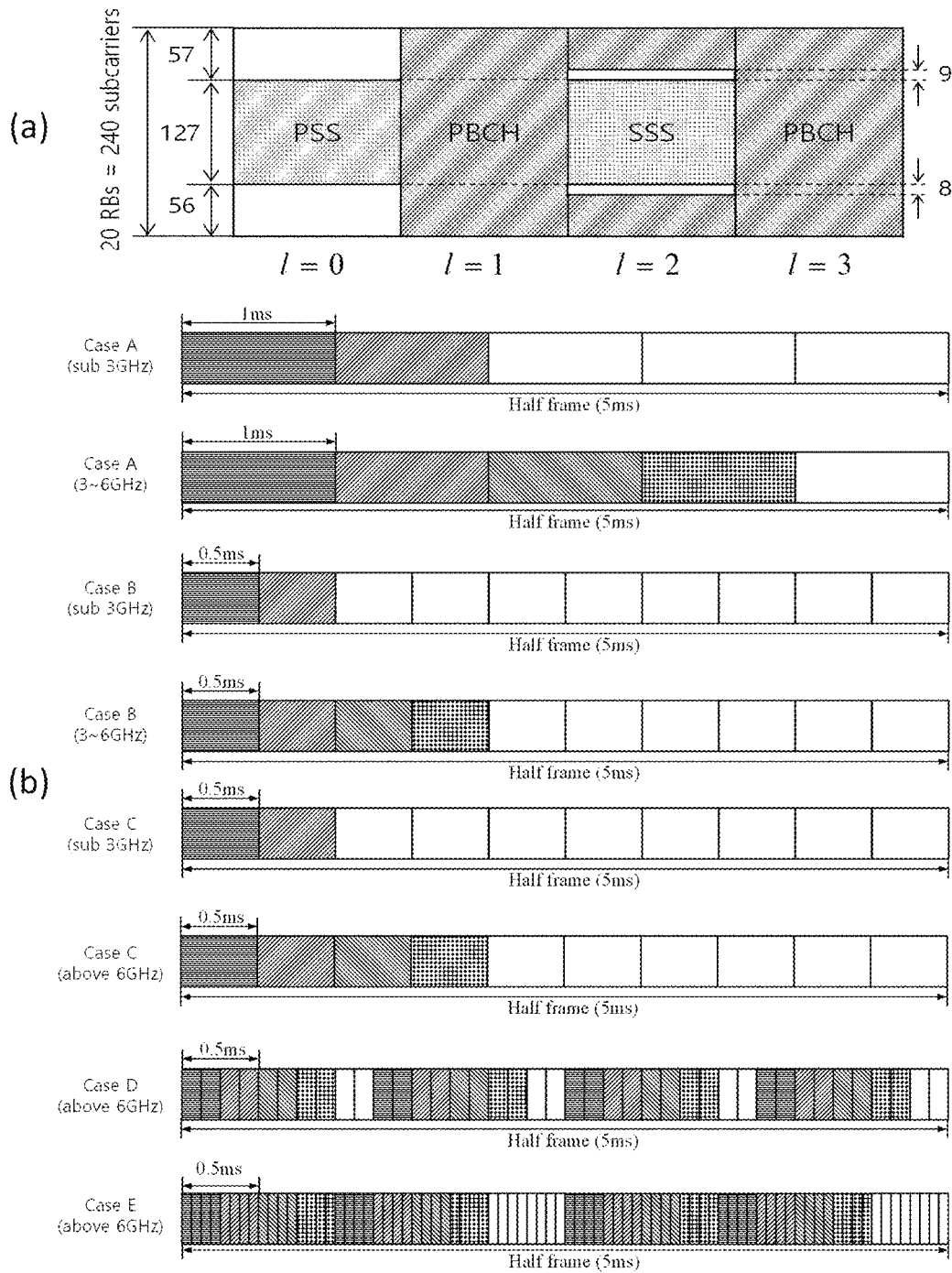
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time region synchronization and/or frequency region synchronization, such as OFDM symbol synchronization and slot synchronization. The SSS can be used to obtain frame synchronization and cell group ID. Referring to FIG. 4A and Table 1, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number/ relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  |  | 0, 1, . . . , 47, |
|  | 2 | 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v |
|  |  | 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID} = 3N^{(1)}_{ID} + N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = (n + 43N^{(2)}_{ID}) \bmod 127$$

$$0 \leq n < 127$$

Here, $x(i+7) = (x(i+4) + x(i)) \bmod 2$ and is given as $$[x(6)x(5)x(4)x(3)x(2)x(1)x(0)] = [1 1 1 0 1 1 0]$$

Further, the sequence $d_{SSS}(n)$ of the SSS is as follows.

$$d_{SSS}(n) = [1 - 2x_0((n+m_0) \bmod 127)]$$
$$[1 - 2x_1((n+m_1) \bmod 127)]$$

$$m_0 = 15 \text{floor}(N^{(1)}_{ID}/112) + 5N^{(2)}_{ID}$$

$$m1 = N^{(1)}_{ID} \bmod 112$$

$$0 \leq n < 127$$

Here, $x_0(i+7) = (x_0(i+4) + x_0(i)) \bmod 2$ $x_1(i+7) = (x_1(i+1) + x_1(i)) \bmod 2$ and is given as $$[x_0(6)x_0(5)x_0(4)x_0(3)x_0(2)x_0(1)x_0(0)] = [0 0 0 0 0 0 1]$$

$$[x_1(6)x_1(5)x_1(4)x_1(3)x_1(2)x_1(1)x_1(0)] = [0 0 0 0 0 0 1]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
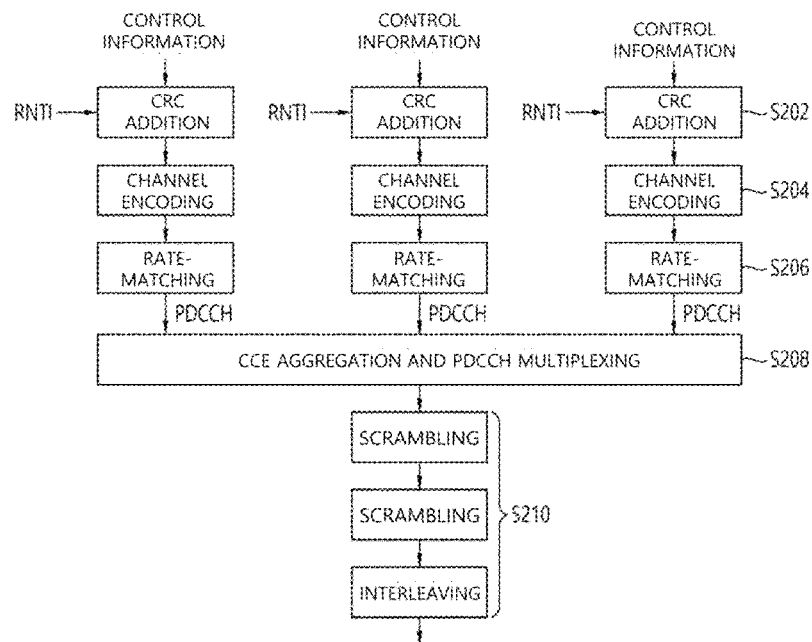
FIGS. 5A and 5B illustrates a procedure for transmitting control information and a control channel in a 3GPP NR system.
Figure 5B:
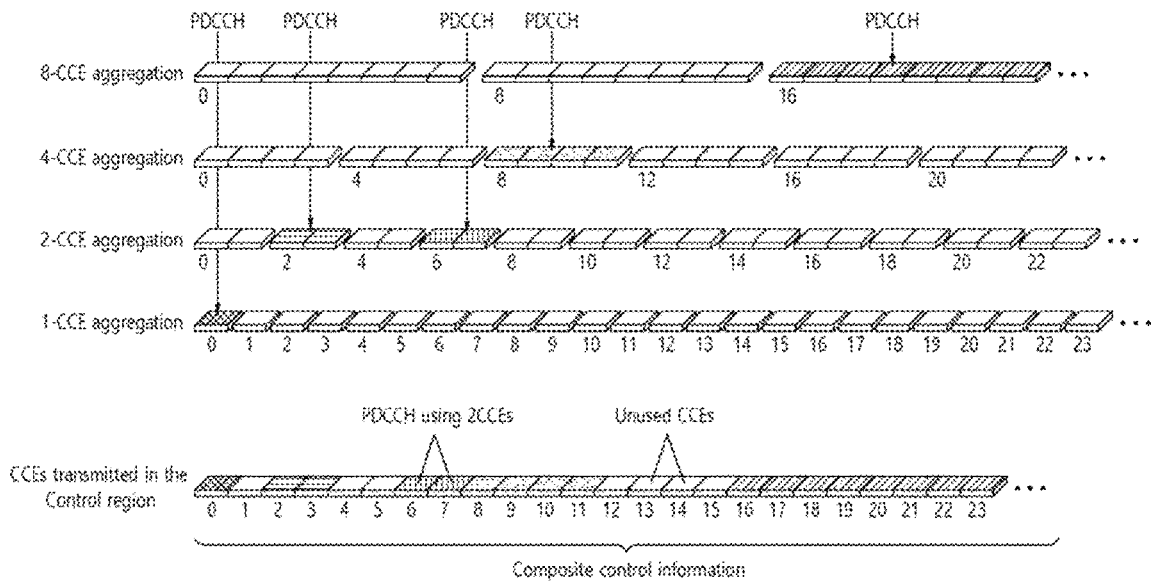

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
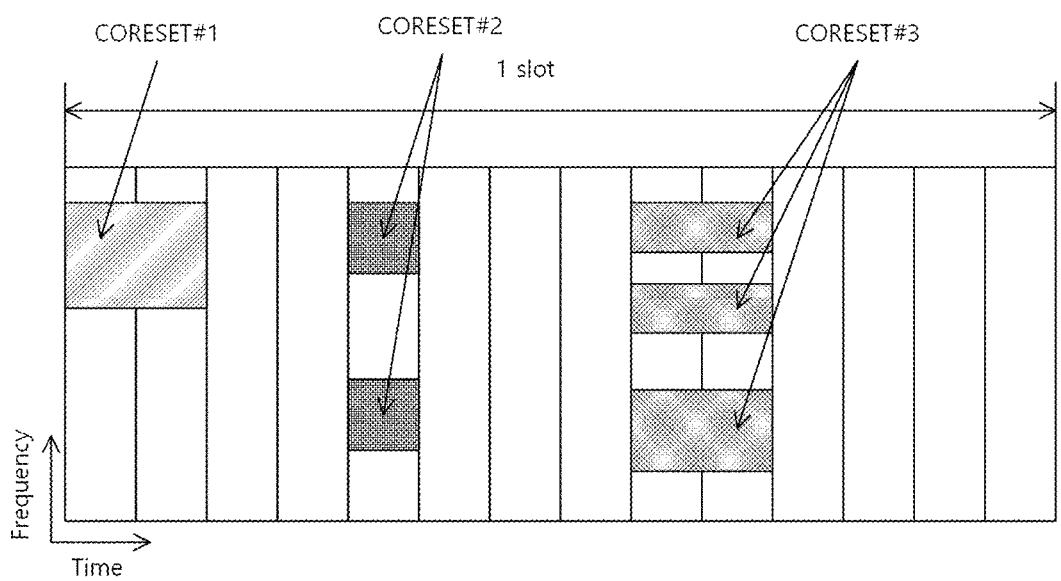
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency region designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
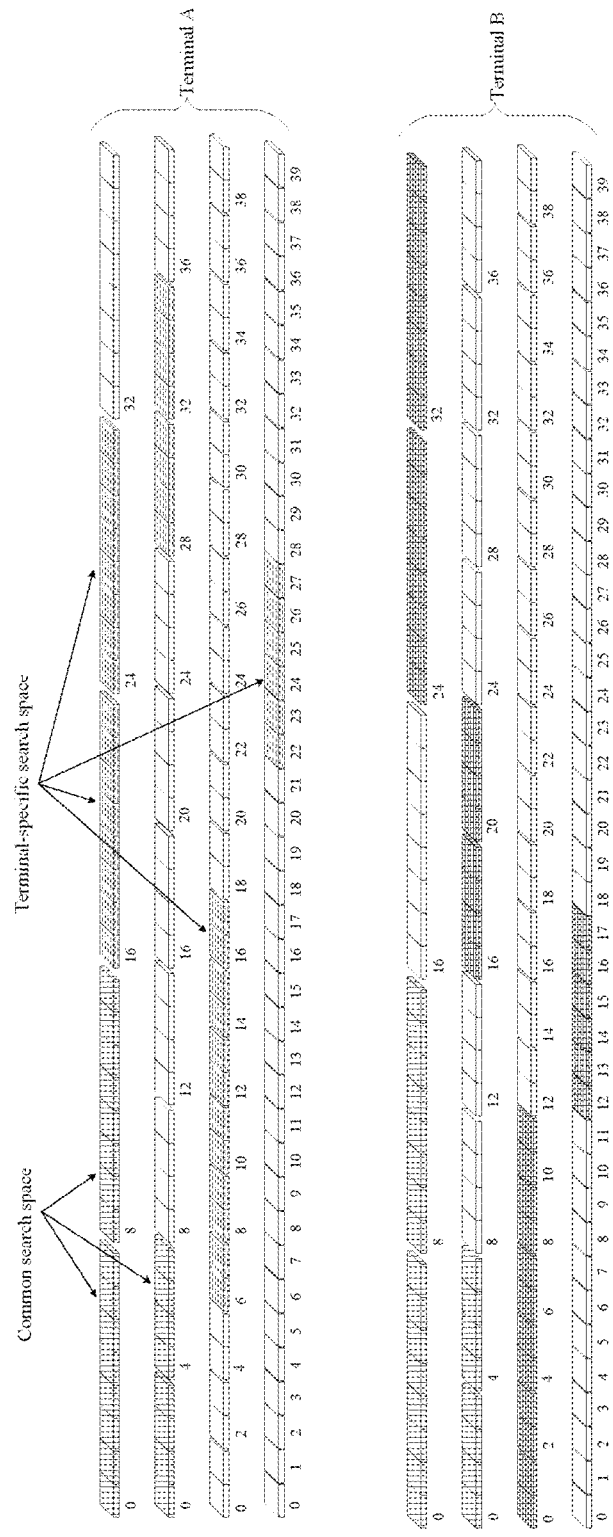
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a down-link-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 2 shows an embodiment of a physical uplink control channel (PUCCH) used in a wireless communication system.

TABLE 2

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)—related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
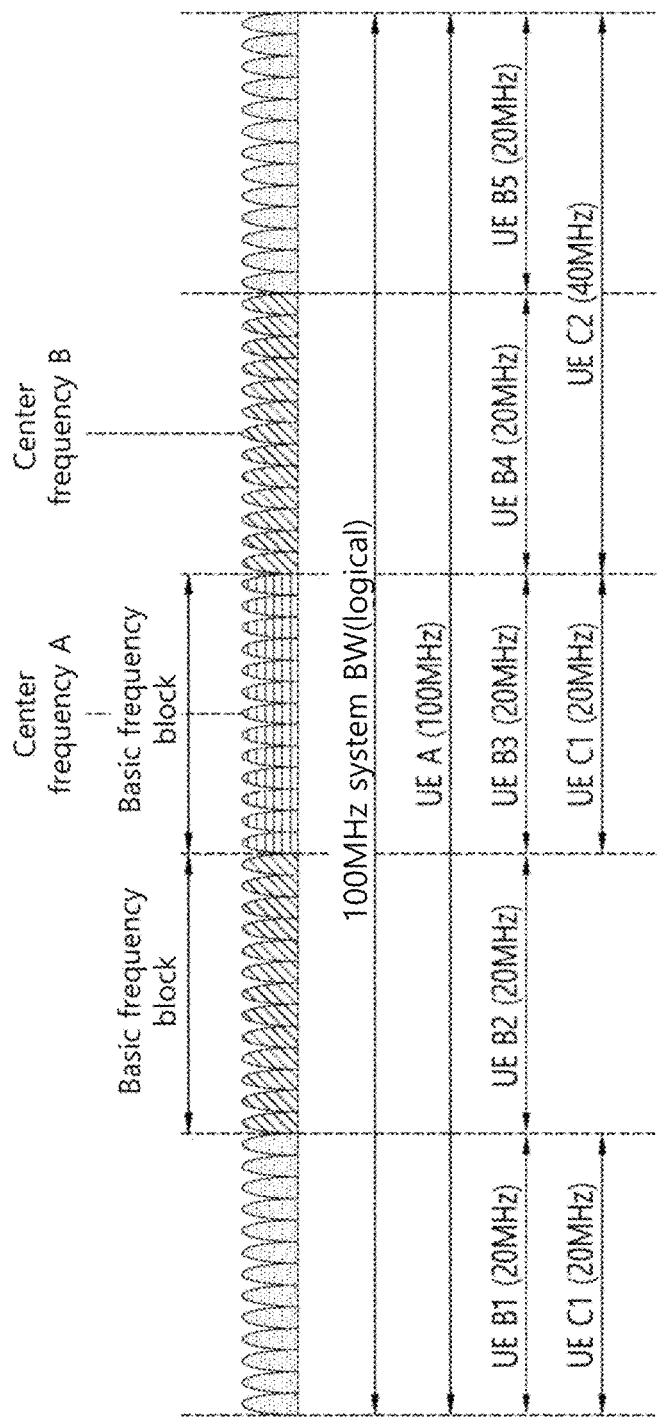
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
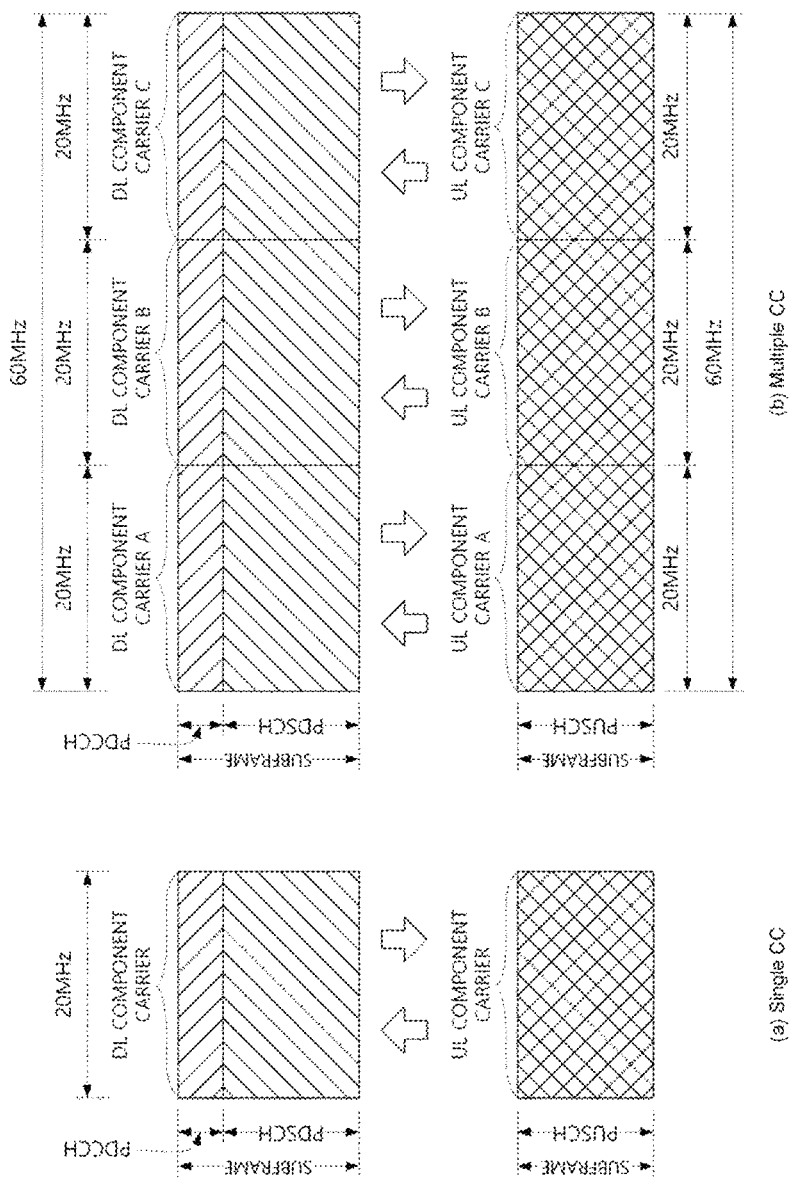
FIG. 9 is a diagram for explaining single carrier communication and multiple carrier communication.

FIG. 9 is a drawing for explaining single carrier communication and multiple carrier communication. Particularly, FIG. 9(*a*) shows a single carrier subframe structure and FIG. 9(*b*) shows a multi-carrier subframe structure.

Referring to FIG. 9(*a*), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time region, and perform data transmission or reception through a UL/DL time unit. Referring to FIG. 9(*b*), three 20 MHz component carriers (CCs) can be aggregated into each of UL and DL, so that a bandwidth of 60 MHz can be supported. Each CC may be adjacent or non-adjacent to one another in the frequency region. FIG. 9(*b*) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
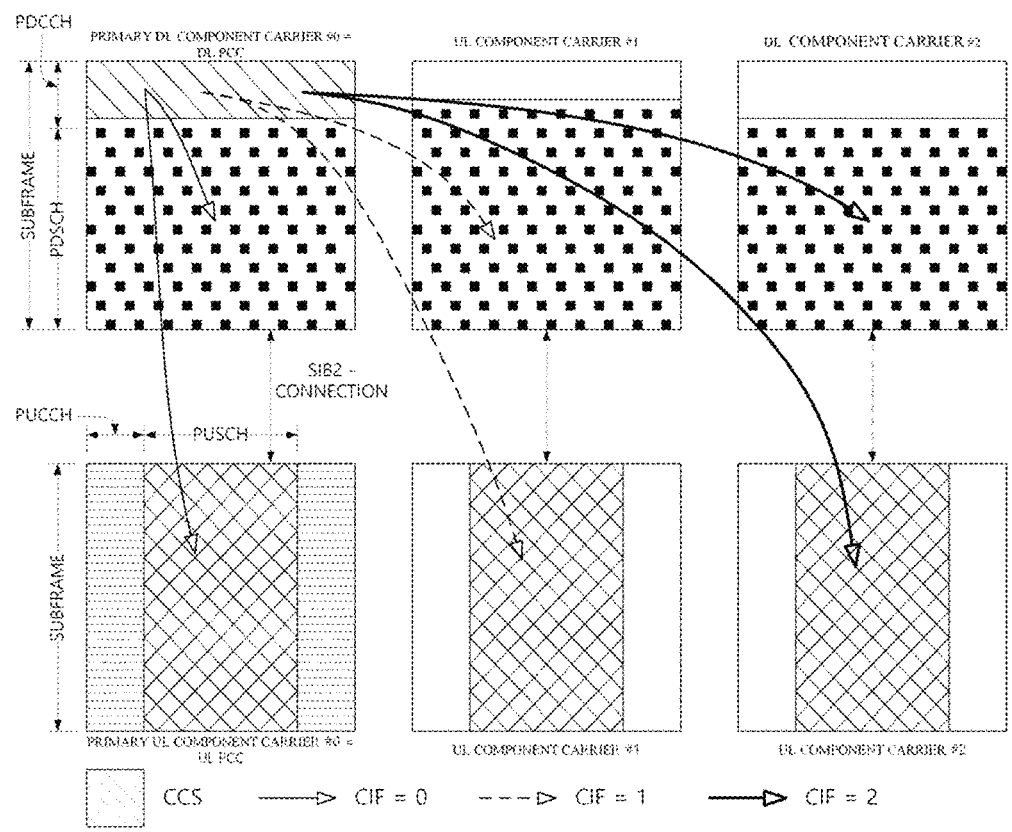
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
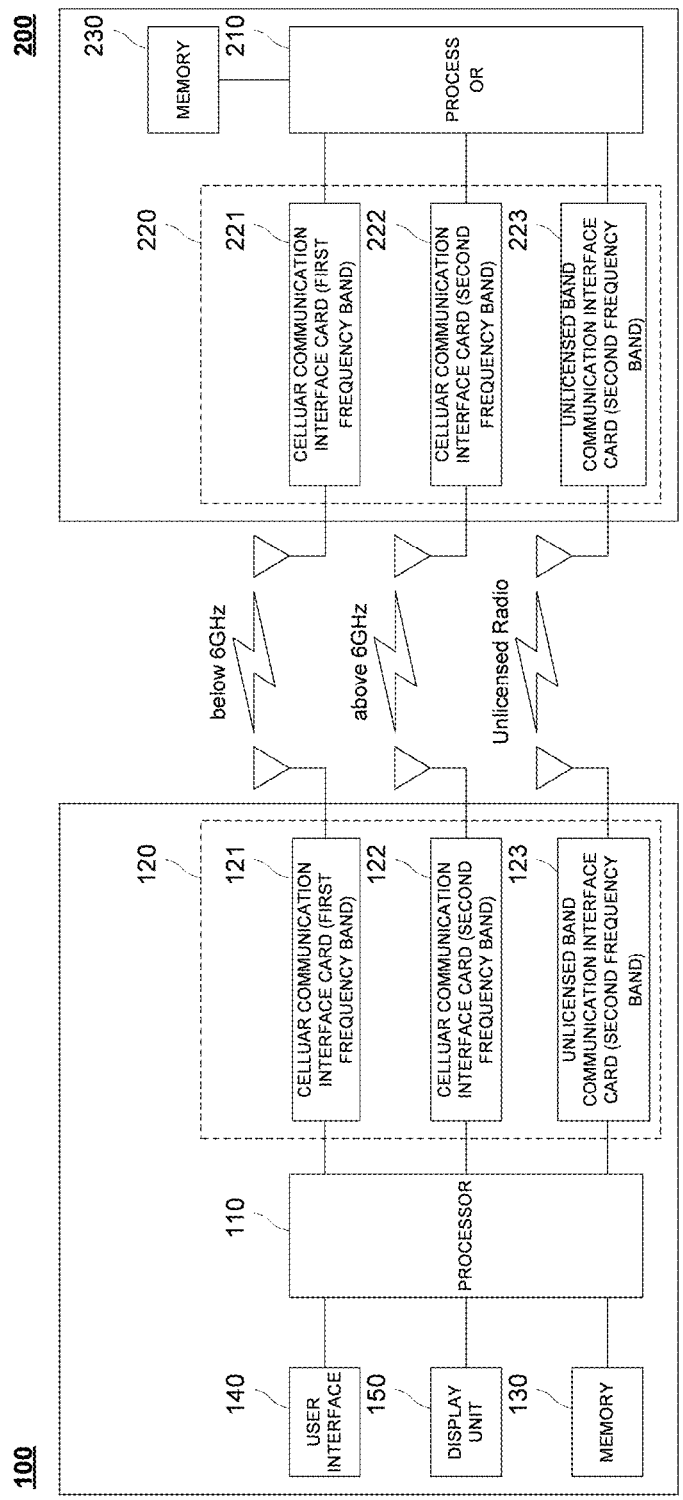
FIG. 11 is a block diagram showing the configurations of a UE and a base station according to an embodiment of the present disclosure.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

In order to support a service requiring low latency and high reliability, such as a URLLC service, a UE needs to receive fast retransmission from a base station by transmitting HARQ-ACK as quickly as possible. However, in 3GPP NR Release 15, only transmission of a PUCCH including at most one piece of HARQ-ACK information is allowed in one slot. Therefore, the UE uses a scheme of: i) transmitting HARQ-ACK responses for different PDSCHs in different slots, respectively; or ii) performing multiplexing in one PUCCH. However, i) is not suitable for providing a low latency time; and in ii), there may be a possibility that a problem occurs in the coverage of PUCCH, that is, reliability. Therefore, a method for transmitting multiple PUCCHs, each of which includes different HARQ-ACK information, in one slot is being discussed.

Method of Transmitting Multiple PUCCHs in One Slot on the Basis of an Indicator

Figure 12:
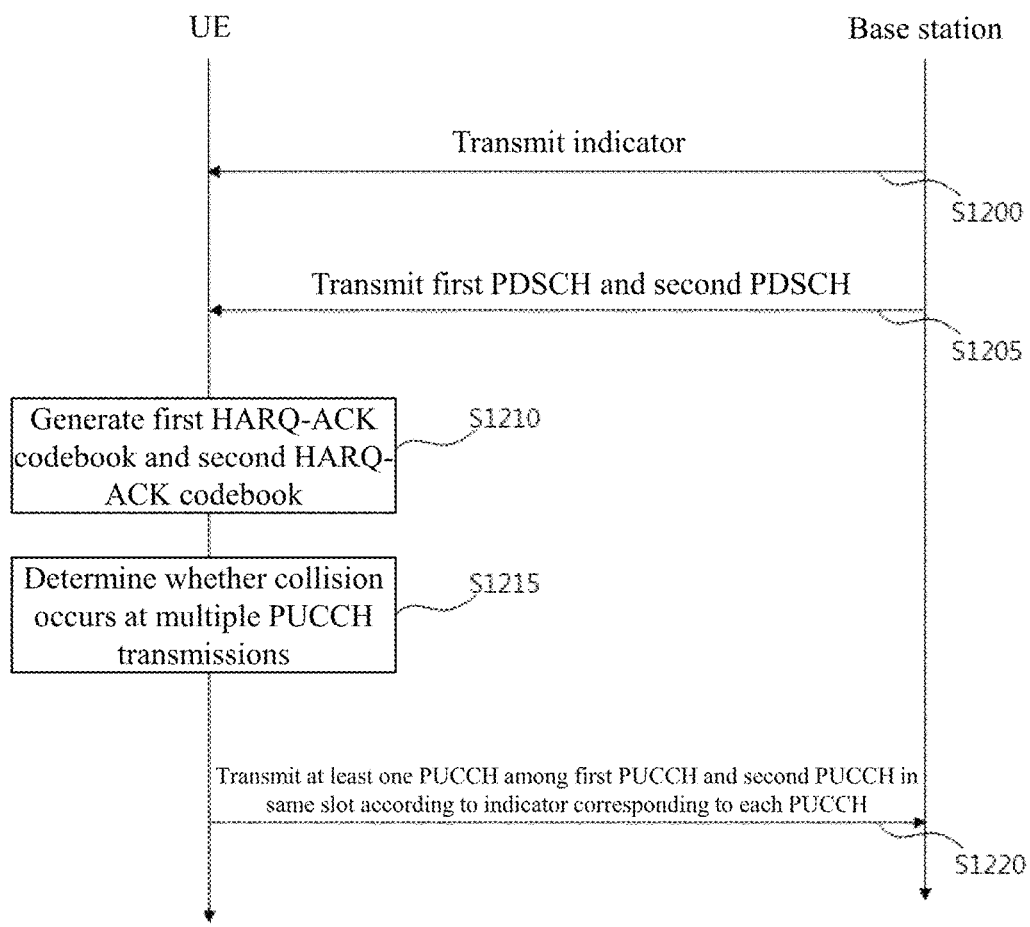
FIG. 12 is a flowchart illustrating a method of transmitting multiple PUCCHs in one slot on the basis of an indicator according to an embodiment.

FIG. 12 is a flowchart illustrating a method of transmitting multiple PUCCHs in one slot on the basis of an indicator according to an embodiment. A base station in FIG. 12 is the same as the base station 200 in FIG. 11, and a UE in FIG. 12 is the same as the UE 100 in FIG. 11.

Referring to FIG. 12, the base station transmits an indicator to the UE, in S1200. The indicator may indicate values corresponding to the number of PUCCHs concurrently transmitted in one slot. For example, if it is possible to transmit up to two PUCCHs concurrently in one slot, the indicator may have two values, for example, 0 or 1. That is, the PUCCHs concurrently transmitted in one slot are identified by respective indicators. If an indicator value of 0 is assigned to one PUCCH, an indicator value of 1 is assigned to the other PUCCH. Similarly, if an indicator value of 1 is assigned to one PUCCH, an indicator value of 0 is assigned to the other PUCCH. An identical indicator value cannot correspond to different PUCCHs.

Figure 13:
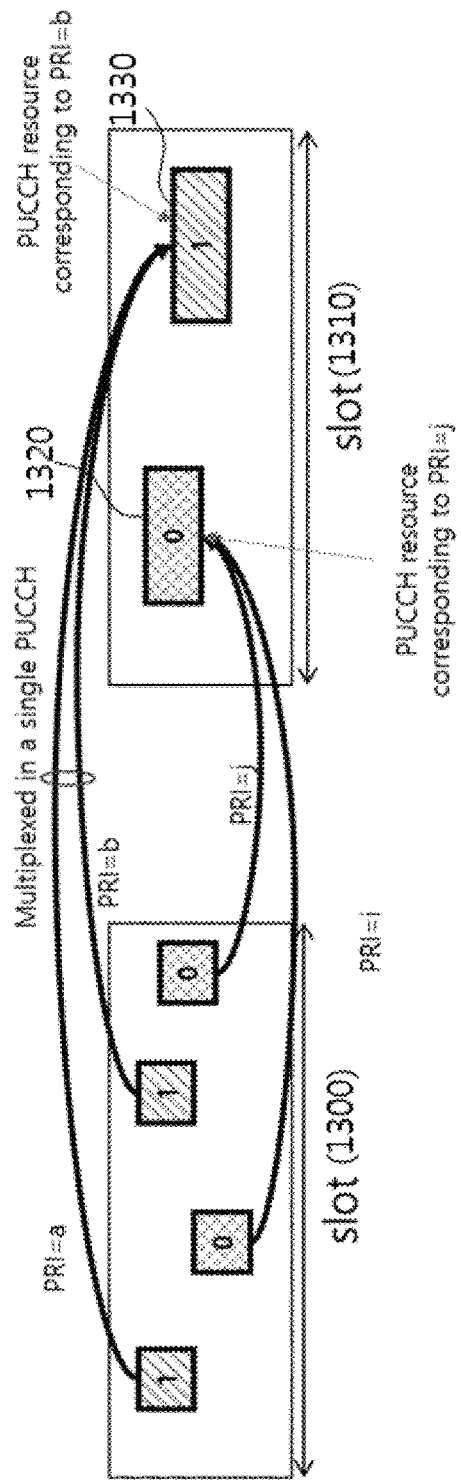
FIG. 13 is a diagram for describing an example of a method of transmitting multiple PUCCHs in one slot.

For example, referring to FIG. 13, the UE receives at least one PDSCH corresponding to an indicator value of 0 in a preceding slot 1300, and then transmits HARQ-ACK relating thereto to the base station via a PUCCH 1320 corresponding to the indicator value of 0 in a following slot 1310. The UE receives PDSCHs corresponding to an indicator value of 1 in the preceding slot 1300, and then transmits HARQ-ACK relating thereto to the base station via a PUCCH 1330 corresponding to the indicator value of 1 in the following slot 1310. That is, multiple PUCCHs 1320 and 1330 concurrently transmitted in the following slot 1310 are indexed with 0 or 1 by indicators, respectively. If a first PUCCH corresponds to the indicator value of 0, a second PUCCH may correspond to the indicator value of 1, and if the first PUCCH corresponds to the indicator value of 1, the second PUCCH may correspond to the indicator value of 0. The indicators may be used as criteria for collision resolution when multiple PUCCH transmissions collide with each other within one slot.

The general range of a value that an indicator may have is as follows. If the number of bits of an indicator is B, and X PUCCHs are to be transmitted in one slot, B=ceil (log 2 (X)). In this case, the indicator may indicate one of values of 0, 1, . . . , X−1.

The indicator may be explicitly indicated or may be implicitly inferred from other information. If the indicator is implicitly inferred, S1200 in FIG. 12 may be omitted. That is, the indicator may not be separately signaled, and the UE may implicitly derive the indicator from other information. In this case, the present embodiment corresponds to an embodiment including the remaining operations obtained by excluding S1200.

As an example, the indicator may be transmitted while being included in a PDCCH (or DCI) for scheduling of a first PDSCH or a second PDSCH, in S1205. In this case, the indicator may be referred to as a PDSCH group indicator or a PDSCH group ID. However, in the present specification, it is denoted as "indicator" for the sake of unification of terms.

As another example, the indicator may be transmitted while being included in RRC signaling.

As another example, the indicator may be information implicitly inferred from a value of another field of the PDCCH (or DCI) for scheduling of the first PDSCH or the second PDSCH, or from a value of another field of RRC signaling. A method of implicitly inferring the indicator is similar to implicitly determining a value of an HARQ-ACK multiplexing indicator, which will be described later.

Transmission of the indicator by the base station according to S1200 corresponds to the operation of the communication module 220 of FIG. 11, and reception of the indicator by the UE corresponds to the operation of the communication module 220 of FIG. 11.

In FIG. 12 again, the base station transmits the first PDSCH and the second PDSCH to the UE, in S1205. Here, the first PDSCH and the second PDSCH may correspond to different types of traffic, for example, eMBB and URLLC. That is, the first PDSCH may be traffic relating to eMBB, and the second PDSCH may be traffic relating to URLLC. In this embodiment, the description is provided that multiple PDSCHs are transmitted in S1205, but the base station may transmit only one PDSCH to the UE. This is because multiple PUCCHs transmitted in the following slot 1310 may include different UCI, such as a scheduling request (SR) transmitted by the UE regardless of a PDSCH, not necessarily HARQ-ACK associated with the PDSCH, in the preceding slot 1300. Transmission of the first and second PDSCHs by the base station according to S1205 corresponds to the operation of the communication module 220 of FIG. 11, and reception of the first and second PDSCHs by the UE corresponds to the operation of the communication module 220 of FIG. 11.

The UE generates a first HARQ-ACK codebook associated with the first PDSCH and generates a second HARQ-ACK codebook associated with the second PDSCH, in S1210. The first HARQ-ACK codebook and the second HARQ-ACK codebook may be mapped to different PUCCHs in the same slot. In other words, the first HARQ-ACK codebook and the second HARQ-ACK codebook may be configured to be transmitted via different PUCCHs within the same slot. Here, the first HARQ-ACK codebook is mapped to the first PUCCH, and the second HARQ-ACK codebook is mapped to the second PUCCH.

When multiple PDSCHs are transmitted, the UE may, as shown in FIG. 13, generate an HARQ-ACK codebook by multiplexing HARQ-ACK of PDSCHs having the same indicator value, and then may transmit the generated HARQ-ACK codebook via the same PUCCH. That is, if different indicator values are used, different PUCCHs may be transmitted in one slot. Referring to FIG. 13, the UE may receive two PDSCHs corresponding to the indicator value of 1 in the preceding slot 1300, may generate an HARQ-ACK codebook by multiplexing multiple pieces of HARQ-ACK relating thereto, and may transmit the HARQ-ACK codebook via a PUCCH corresponding to the indicator value of 1 in the following slot 1310. The UE may receive two PDSCHs corresponding to the indicator value of 0 in the preceding slot 1300, may generate an HARQ-ACK codebook by multiplexing multiple pieces of HARQ-ACK relating thereto, and may transmit the HARQ-ACK codebook via a PUCCH corresponding to the indicator value of 0 in the following slot 1310. As a result, a total of two PUCCHs for four PDSCHs are transmitted in one slot.

When multiple PUCCHs are transmitted, a method of generating an HARQ-ACK codebook for each PUCCH is as follows.

Each HARQ-ACK codebook may be generated in a different manner. For example, the first HARQ-ACK codebook may be generated in a semi-static manner, and the second HARQ-ACK codebook may be generated in a dynamic manner.

The UE needs to determine HARQ-ACK bits included in each PUCCH, that is, an HARQ-ACK codebook. In particular, if the UE is configured to use a semi-static HARQ-ACK codebook (or type 1 HARQ-ACK codebook), the UE generates a semi-static HARQ-ACK codebook to be transmitted via a PUCCH corresponding to each indicator value. If the semi-static HARQ-ACK codebook corresponding to each indicator value is independently generated without a separate definition, a semi-static HARQ-ACK codebook of the same size is transmitted in the same slot via each PUCCH, and thus a problem in that coverage of an uplink PUCCH is limited occurs.

Therefore, the present embodiment provides a method of reducing the size of a semi-static HARQ-ACK codebook transmitted via PUCCHs corresponding to different indicator values in one slot.

According to an aspect, the UE includes PDSCH candidates, which are likely to be transmitted in the preceding half slot of halved slots obtained by splitting a slot in half, in the semi-static HARQ-ACK codebook corresponding to the indicator value of 0. In addition, the UE may include PDSCH candidates, which are likely to be transmitted in the following half slot, in the semi-static HARQ-ACK codebook corresponding to the indicator value of 1. That is, the UE and the base station may determine that a semi-static HARQ-ACK codebook corresponding to which indicator value includes the PDSCH, by using time domain resource assignment information occupied by the PDSCH candidates.

According to another aspect, the UE may determine that a semi-static HARQ-ACK codebook corresponding to which indicator value includes HARQ-ACK associated with the PDSCH, according to k1 values (PDSCH-to-HARQ_feedback timing indicators) indicated by the PDCCH (or DCI). Here, the k1 value is indicated via a PDSCH-to-HARQ_feedback timing indicator field of the PDCCH (or DCI), and corresponds to an interval (=number of slots) between a slot in which a scheduled PDSCH ends and a slot in which the PUCCH associated with HARQ-ACK is transmitted. For example, when 8 k1 values are configured or given to the UE, HARQ-ACK of PDSCHs indicated by four small k1 values among the 8 k1 values may be included in the semi-static HARQ-ACK codebook corresponding to the indicator value of 0, and HARQ-ACK of PDSCHs indicated by the remaining four large k1 values may be included in the semi-static HARQ-ACK codebook corresponding to the indicator value of 1.

According to another aspect, the UE may determine that a semi-static HARQ-ACK codebook corresponding to which indicator value includes HARQ-ACK of the PDSCH, according to length (number of occupied symbols) values of the PDSCH indicated by the PDCCH (or DCI). For example, if the (symbol) length of a PDSCH is 2 or 4, HARQ-ACK associated with the PDSCH is included in the semi-static HARQ-ACK codebook corresponding to the indicator value of 0, and HARQ-ACK associated with a PDSCH with the (symbol) length of 7 or more may be included in the semi-static HARQ-ACK codebook corresponding to the indicator value of 1.

According to another aspect, the UE may determine that a semi-static HARQ-ACK codebook corresponding to which indicator value includes HARQ-ACK of the PDSCH, according to a PDSCH mapping type indicated by the PDCCH (or DCI). For example, if the PDSCH mapping type indicates A, HARQ-ACK of the PDSCH is included in the semi-static HARQ-ACK codebook corresponding to the indicator value of 0, and if the PDSCH mapping type indicates B, HARQ-ACK of the PDSCH may be included in the semi-static HARQ-ACK codebook corresponding to the indicator value of 1.

According to another aspect, the UE may determine that a semi-static HARQ-ACK codebook corresponding to which indicator value includes HARQ-ACK associated with each PDSCH, according to an index of a time domain resource assignment field indicated by the PDCCH (or DCI). For example, HARQ-ACK associated with PDSCHs indicated by the index 0 to 7 (bits 0000 to 0111) may be included in the semi-static HARQ-ACK codebook corresponding to the indicator value of 0, and HARQ-ACK associated with PDSCHs indicated by the remaining indices 8 to 15 (bits 1000 to 1111) may be included in the semi-static HARQ-ACK codebook corresponding to the indicator value of 1.

According to another aspect, when the base station configures, for the UE, a semi-static HARQ-ACK codebook of a specific indicator value, the number of pieces of HARQ-ACK (or PDSCHs) required per slot may be configured. For example, if two HARQ-ACK bits are configured per slot, when the UE generates a semi-static HARQ-ACK codebook of a specific indicator value, a semi-static HARQ-ACK codebook including up to 2 bits per slot may be generated. In other words, the UE expects to receive up to two PDSCHs (1 bit per PDSCH) indicated by the specific indicator value in one slot. The numbers of pieces of HARQ-ACK (or PDSCHs) required per slot may be configured to be different values in semi-static HARQ-ACK codebooks corresponding to different indicator values.

According to another aspect, the UE may configure an HARQ-ACK codebook of a specific indicator value in a semi-static HARQ-ACK codebook manner, and may configure an HARQ-ACK codebook of another specific indicator value in a dynamic HARQ-ACK codebook manner.

According to another aspect, when the UE receives only one PDSCH having a specific indicator value (that is, if there is no HARQ-ACK of another PDSCH to be multiplexed), the UE may transmit only HARQ-ACK for the one received PDSCH via the PUCCH.

According to another aspect, when the UE receives configuration information of a PUCCH resource indicator (PRI) from the base station, the UE may receive configuration information of an indicator corresponding to each PRI value. For example, it is assumed that an indicator may have four values, such as 0, 1, 2, and 3, and the UE receives 16 PUCCH configuration and PRI values (=0, 1, . . . , 15) from the base station. In this case, when each PUCCH configuration and PRI value is configured, the base station may configure 0, 1, 2, or 3 as an indicator value for the UE. That is, the indicator value of 0 may be configured for a PRI value of 0, 1, 2, or 3, the indicator value of 1 may be configured for a PRI value of 4, 5, 6, or 7, an indicator value of 2 may be configured for a PRI value of 8, 9, 10, or 11, and an indicator value of 3 may be configured for a PRI value of 12, 13, 14, or 16. The UE may find out an indicator value on the basis of a PRI value of DCI for scheduling of PDSCH. In the previous example, if the PRI value of DCI is 10, the UE may know that the indicator value is 2.

Generation and transmission of the first and second HARQ-ACK codebooks by the UE according to S1210 correspond to operation of the processor 110 of FIG. 11.

The UE determines whether there is a collision when multiple PUCCHs are transmitted, in S1215. PRIs are allocated to the first PUCCH and the second PUCCH, to which the first HARQ-ACK codebook and the second HARQ-ACK codebook are mapped respectively, according to a specific rule.

For example, referring to FIG. 13, PUCCH resources for transmitting HARQ-ACK of two PDSCHs having the indicator value of 0 may be determined according to a PRI indicated in the PDCCH (or DCI) scheduled later from among the two PDSCHs. Similarly, PUCCH resources for transmitting HARQ-ACK of two PDSCHs having the indicator value of 1 may be determined according to a PRI indicated in the PDCCH (or DCI) scheduled later from among the two PDSCHs.

Figure 14:
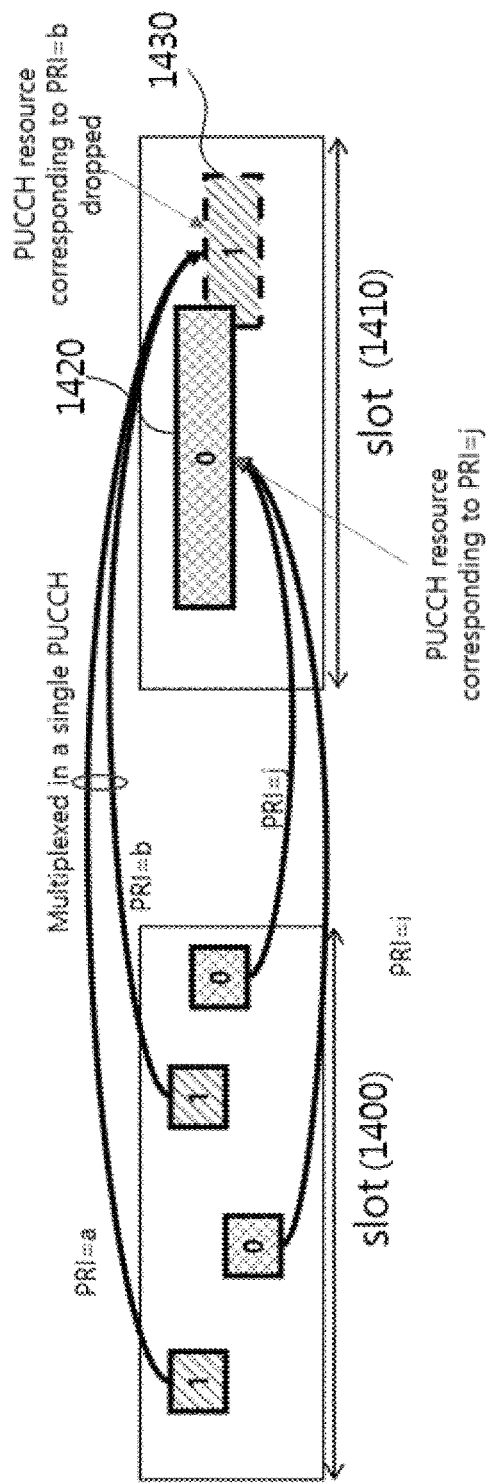
FIG. 14 is a diagram for describing another example of a method of transmitting multiple PUCCHs in one slot.

If the PUCCH resources indicated by two PRI values do not overlap each other, the UE may determine that the two PUCCHs do not collide in one slot. On the other hand, if the resources of PUCCHs 1420 and 1430 corresponding to two PRI values (or different indicator values) overlap each other in a following slot 1410 as shown in FIG. 14, it is determined that the two PUCCH transmissions collide.

Therefore, the UE transmits at least one PUCCH of the first PUCCH and the second PUCCH to the base station in the same slot on the basis of an indicator corresponding to each PUCCH, in S1220.

That is, if a collision occurs in S1215, both PUCCHs cannot be transmitted. That is, when the UE transmits two PUCCHs in one slot, if the resource of the PUCCH corresponding to the indicator value of 0 and the resource of the PUCCH resource corresponding to the indicator value of 1 overlap, the UE cannot transmit the two PUCCHs at the same time. Here, the overlapping resources may be time and/or frequency resources.

In this case, there may be a method in which the UE drops one PUCCH among the first PUCCH corresponding to the indicator value of 0 and the second PUCCH corresponding to the indicator value of 1 and transmits the other PUCCH, or a method in which the HARQ-ACK codebooks of the first PUCCH corresponding to the indicator value of 0 and the second PUCCH corresponding to the indicator value of 1 are multiplexed and transmitted via one PUCCH. The term "drop" may be replaced with terms such as suspend, discard, and postpone. Hereinafter, such operations will be described in a more specific embodiment.

As an example, the UE may select or determine a PUCCH for transmission from among two PUCCHs on the basis of an indicator value. Specifically, a method of determining whether to drop one of two PUCCHs and transmit the other PUCCH is as follows.

In one aspect, the UE transmits a PUCCH corresponding to the first indicator value (e.g., 0) and drops a PUCCH corresponding to the second indicator value (e.g., 1). Here, a case in which the indicator value is 0 may be considered to have higher priority than a case in which the indicator value is 1. Which of the indicator values of 0 and 1 has a higher priority may be determined differently. Here, the priority of a PUCCH may be determined differently according to a type of service data or a type of traffic carried by a PDSCH associated with each PUCCH. For example, when a PDSCH associated with the first PUCCH carries URLLC-related data and a PDSCH associated with the second PUCCH carries eMBB-related data, the first PUCCH may have a higher priority than the second PUCCH.

In another aspect, the UE transmits a PUCCH corresponding to an indicator value based on the most recently received PDCCH (or DCI), and drops a PUCCH corresponding to an indicator value of otherwise.

In another aspect, a PUCCH having a lower (i.e., more reliable) value of a code rate from among the two colliding or overlapping PUCCHs is transmitted, and the other PUCCH is dropped.

In another aspect, a PUCCH of a preceding resource from among the two colliding or overlapping PUCCHs is transmitted, and a PUCCH of a following resource is dropped. Determination of a preceding resource may be based on last symbols of resources, wherein it may be said that, if the last symbols are the same, a resource with a preceding start symbol is a preceding resource.

In another aspect, a PUCCH occupying a longer symbol from among the two colliding or overlapping PUCCHs is transmitted and a PUCCH occupying a smaller symbol is dropped. That is, a transmitted PUCCH and a PUCCH to be dropped may be determined on the basis of the length (the number of symbols) occupied by the PUCCH.

In another aspect, a PUCCH with a small PRI value from among the two colliding or overlapping PUCCHs is transmitted, and a PUCCH with a large PRI value is dropped. That is, a transmitted PUCCH and a PUCCH to be dropped may be determined on the basis of the PRI value of the PUCCH.

As another example, the UE may multiplex HARQ-ACK codebooks of two PUCCHs, and then may transmit the same via one PUCCH. In order to transmit, via one PUCCH, two HARQ-ACK codebooks to be originally mapped to two PUCCHs, the UE may process or transform the HARQ-ACK codebooks according to the following embodiment.

In one aspect, the UE may generate one merged large HARQ-ACK codebook by successively connecting HARQ-ACK codebooks according to a sequence of indicator values, and may transmit the HARQ-ACK codebook via one PUCCH.

In another aspect, the UE may newly generate an HARQ-ACK codebook for PDSCH candidates associated with two colliding or overlapping PUCCHs (that is, generating a semi-static HARQ-ACK codebook for all PDSCH candidates), and may transmit the HARQ-ACK codebook via one PUCCH. Alternatively, when the UE generates one merged large HARQ-ACK codebook by continuously connecting HARQ-ACK codebooks according to the sequence of indicator values, HARQ-ACK bits included in a preceding HARQ-ACK codebook may be excluded from a following HARQ-ACK codebook. The advantage of this example is that when HARQ-ACK bits for one PDSCH candidate exist in both overlapping two PUCCHs, there is no need for duplicate transmissions.

Determination, according to S1215, of whether there is a collision when the UE transmits multiple PUCCHs corresponds to the operation of the processor 110 of FIG. 11.

In addition, transmission of at least one PUCCH among the first PUCCH and the second PUCCH in the same slot by the UE on the basis of an indicator corresponding to each PUCCH according to S1220 may correspond to the operation of the communication module 120 of FIG. 11. Reception of at least one PUCCH among the first PUCCH and the second PUCCH in the same slot from the UE by the base station on the basis of an indicator corresponding to each PUCCH according to S1220 may correspond to the operation of the communication module 220 of FIG. 11.

Timing Design (Finer k1 Granularity) of PDSCH and HARQ-ACK when Multiple PUCCHs are Transmitted in One Slot In order to indicate, to the UE, a slot for transmission of HARQ-ACK associated with a PDSCH, the base station may include a k1 value (PDSCH-to-HARQ_feedback timing indicator) in a PDCCH (or DCI) for scheduling of the PDSCH so as to transmit the k1 value to the UE. The k1 value is indicated via a PDSCH-to-HARQ_feedback timing indicator field of the PDCCH (or DCI), and corresponds to an interval (=number of slots) between a slot in which the scheduled PDSCH ends and a slot in which the PUCCH associated with HARQ-ACK is transmitted. However, if a unit of the k1 value is a slot, there exists ambiguity in defining timing for transmission of two or more pieces of HARQ-ACK (or PUCCHs) in one slot.

Figure 15:
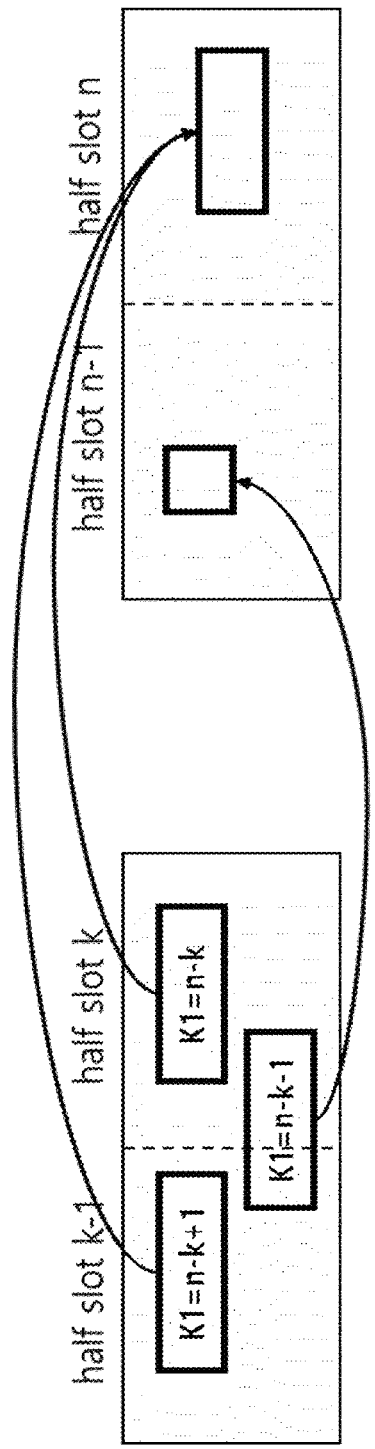
FIG. 15 is a diagram for describing a method of defining a unit of a k1 value to be a sub-slot that is a smaller unit than a basic slot.

Therefore, in this embodiment, in order to transmit multiple PUCCHs associated with multiple pieces of HARQ-ACK in one slot, the unit (or granularity) of the k1 value is defined to be a sub-slot, that is a smaller unit compared to a basic slot. For example, as shown in FIG. 15, the unit of k1 may be determined to be a half slot of the basic slot. In this case, one basic slot includes two half slots (k−1 and k). Therefore, the k1 value is defined to be the number of half slots included between half slot k in which the scheduled PDSCH ends and half slot n in which the PUCCH for transmission of HARQ-ACK is transmitted.

In this case, an interval between reception timing of the PDSCH and transmission timing of an HARQ-ACK codebook associated with the PDSCH may be defined in units of the number (=b) of symbols less than the number (=a) of symbols constituting one slot.

As an example, when the unit of the k1 value is given as a sub-slot (or a set of symbols), the k1 value indicates the number of sub-slots between a sub-slot including a last symbol of the PDSCH and a sub-slot including a first symbol of the PUCCH. For example, if the value of k1 is 0, this indicates that the sub-slot including the last symbol of the PDSCH and the sub-slot including the first symbol of the PUCCH are the same.

As another example, when the unit of the k1 value is given as a sub-slot (or a set of symbols), the k1 value indicates the number of sub-slots between the sub-slot including the last symbol of the PDSCH and the sub-slot including the first symbol of the PUCCH. For example, if the k1 value is 0, this indicates that a last sub-slot of the slot including the last symbol of the PDSCH and the sub-slot including the first symbol of the PUCCH are the same.

As another example, when the unit of the k1 value is given as a sub-slot (or a set of symbols), the k1 value indicates the number of sub-slots between the most preceding sub-slot among sub-slots after $T_{proc,1}$ time from the last symbol of the PDSCH and the sub-slot including the first symbol of the PUCCH. $T_{proc,1}$ represents a minimum time it takes for the UE to receive the PDSCH and to transmit valid HARQ-ACK. 3GPP TS38.214 document may be referred to for a value of $T_{proc,1}$.

As described above, when the unit of the k1 value is given as a sub-slot (or a set of symbols), if a situation in which multiple PUCCHs overlap within one slot occurs, the operation of the UE will be described as follows. This is for a method of PUCCH transmission in a situation where PUCCH resources indicated in units of half slots (or k1 unit) overlap.

Figure 16:
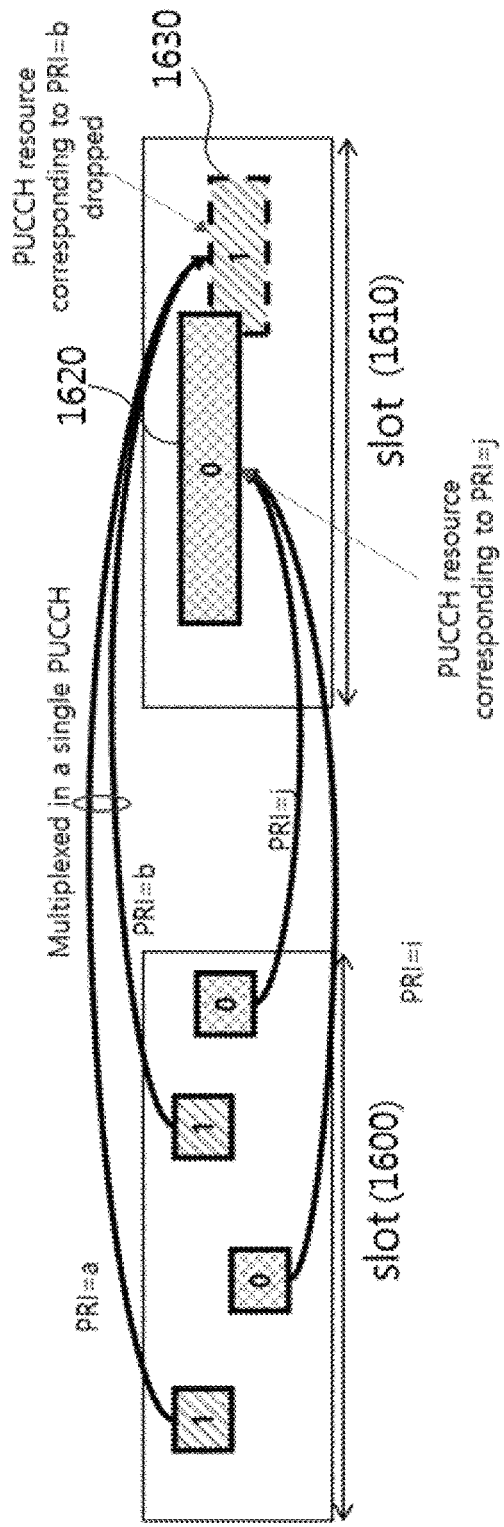
FIG. 16 is a diagram illustrating a situation in which multiple PUCCH transmissions collide within one slot according to an example.

FIG. 16 is a diagram illustrating a situation in which multiple PUCCH transmissions collide within one slot according to an example.

Referring to FIG. 16, when a PUCCH (indexed with indicator value=0) 1620 starting from a preceding half slot and a PUCCH (indexed with indicator value=1) 1630 starting from a following half slot overlap, the UE cannot transmit both PUCCHs at the same time. Here, the UE may drop one PUCCH among the two PUCCHs and transmit the other PUCCH, or may transmit HARQ-ACK codebooks of the two PUCCHs via one PUCCH.

As an example, the UE may determine a PUCCH for transmission from among the two PUCCHs on the basis of an indicator value. Specifically, a method of determining whether to drop one of the two PUCCHs and transmit the other PUCCH is as follows.

In one aspect, the UE transmits a PUCCH corresponding to the first indicator value (e.g., 0) and drops a PUCCH corresponding to the second indicator value (e.g., 1). Here, a case in which the indicator value is 0 may be considered to have higher priority than a case in which the indicator value is 1. Which of the indicator values of 0 and 1 has a higher priority may be determined differently.

In another aspect, the UE transmits a PUCCH corresponding to an indicator value based on the most recently received PDCCH (or DCI), and drops a PUCCH corresponding to an indicator value of otherwise.

In another aspect, a PUCCH having a lower (i.e., more reliable) value of a code rate from among the two colliding or overlapping PUCCHs is transmitted, and the other PUCCH is dropped.

In another aspect, a PUCCH of a preceding resource from among the two colliding or overlapping PUCCHs is transmitted, and a PUCCH of a later resource is dropped. Determination on preceding of a resource may be based on last symbols of resources, wherein it may be said that, if the last symbols are the same, a resource with a preceding start symbol is a preceding resource.

In another aspect, a PUCCH occupying a longer symbol from among the two colliding or overlapping PUCCHs is transmitted and a PUCCH occupying a smaller symbol is dropped. That is, a transmitted PUCCH and a PUCCH to be dropped may be determined on the basis of the length (the number of symbols) occupied by the PUCCH.

In another aspect, a PUCCH with a small PRI value from among the two colliding or overlapping PUCCHs is transmitted, and a PUCCH with a large PRI value is dropped. That is, a transmitted PUCCH and a PUCCH to be dropped may be determined on the basis of the PRI value of the PUCCH.

As another example, the UE may multiplex HARQ-ACK codebooks of two PUCCHs, and then may transmit the same via one PUCCH. In order to transmit, via one PUCCH, two HARQ-ACK codebooks to be originally mapped to two PUCCHs, the UE may process or transform the HARQ-ACK codebooks according to the following embodiment.

In one aspect, the UE may generate one merged large HARQ-ACK codebook by successively connecting HARQ-ACK codebooks in a time sequence, and may map the HARQ-ACK codebook to one PUCCH and transmit the same. For example, the UE may perform configuration so that an HARQ-ACK codebook, for which transmission in a preceding half slot in one slot is indicated, is located in front of an HARQ-ACK codebook for which transmission in a following half slot is indicated.

In another aspect, the UE may newly generate an HARQ-ACK codebook for PDSCH candidates associated with two colliding or overlapping PUCCHs (that is, generating a semi-static HARQ-ACK codebook for all PDSCH candidates), and may transmit the HARQ-ACK codebook via one PUCCH. Alternatively, when the UE generates one merged large HARQ-ACK codebook by continuously connecting HARQ-ACK codebooks according to a sequence of indicator values, HARQ-ACK bits included in a preceding HARQ-ACK codebook may be excluded from a following HARQ-ACK codebook. The advantage of this example is that when HARQ-ACK bits for one PDSCH candidate exist in both overlapping two PUCCHs, there is no need for duplicate transmissions.

These operations at HARQ-ACK collision according to FIG. 16 may be performed by the processor 110 or the communication module 120 of FIG. 11.

Method of Configuring Sub-Slot and Method of Generating Semi-Static HARQ-ACK Codebook The present embodiment relates to a method of dividing a slot into multiple sub-slots.

For example, when a slot including 14 symbols is divided into two sub-slots, each sub-slot may include 7 consecutive symbols. In this case, a first sub-slot includes first 7 symbols of the slot, and a second sub-slot includes last 7 symbols of the slot. Alternatively, when the slot including 14 symbols is divided into two sub-slots, the first sub-slot may include odd-numbered symbols of the slot, and the second sub-slot may include even-numbered symbols of the slot.

As an example, according to a first method of dividing a slot including K symbols into N sub-slots, (K mod N) sub-slots may include floor(K/N)+1 consecutive symbols, and N−(K mod N) sub-slots may include floor(K/N) consecutive symbols.

In one aspect, among n sub-slots, (K mod N) sub-slots having one more symbols may be located at a front end of each slot, and the remaining N−(K mod N) sub-slots having one fewer symbol may be located at a rear end of each slot.

In another aspect, among n sub-slots, N−(K mod N) sub-slots having one fewer symbol may be located at the front end of the slot, and the remaining (K mod N) sub-slots having one more symbols may be located at the rear end of the slot.

In another aspect, among n sub-slots, (K mod N) sub-slots having one more symbols and N−(K mod N) sub-slots having one fewer symbol may be located at the front end and the rear end of each slot while alternating with each other.

As another example, according to a second method of dividing a slot including K symbols into N sub-slots, an n-th sub-slot may include floor(K/N)*i+nth (i=0,1, ... ) symbols.

As another example, the UE may divide each slot into multiple sub-slots on the basis of configured time domain resource assignment information of a PDSCH. For example, the slot may be divided into sub-slots according to a sequence of locations of last symbols of the PDSCH in the time domain resource allocation information of the PDSCH. Up to a last symbol of last symbols of A PDSCHs that are most preceding in the sequence of the last symbols of the PDSCHs may be divided into a first sub-slot. Subsequently, the remaining sub-slots may be divided using the above method.

As another example, the UE may divide each slot into multiple sub-slots on the basis of configured information on symbols occupied by a PUCCH. For example, each slot may be divided into sub-slots according to a sequence of locations of last symbols of the PUCCH in the information of the symbols occupied by the PUCCH. Up to a last symbol of last symbols of A PUCCHs that are most preceding in the sequence may be divided into a first sub-slot. Subsequently, the remaining may be divided using the above method.

The present embodiment also discloses a method of generating a semi-static HARQ-ACK codebook when the unit of the k1 value is configured in units of sub-slots (or a set of symbols). The method of generating the semi-static HARQ-ACK codebook according to the present embodiment may correspond to the operation of the processor 110 or the communication module 120 of FIG. 11.

Figure 17:
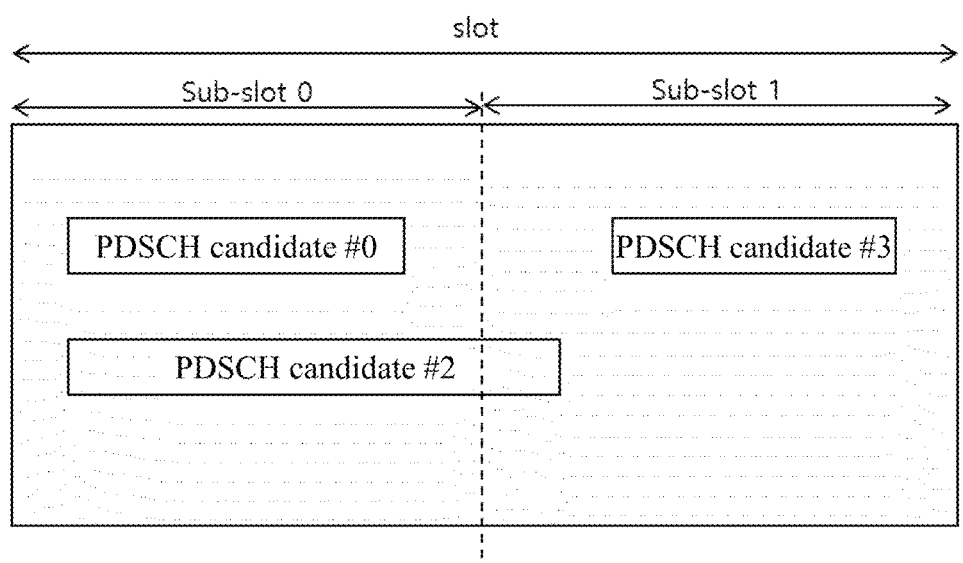
FIG. 17 is a diagram exemplarily illustrating multiple PDSCH candidates transmittable over sub-slots according to an example.

FIG. 17 is a diagram exemplarily illustrating multiple PDSCH candidates transmittable over sub-slots according to an example.

Referring to FIG. 17, it is assumed that three PDSCH candidates exist in one slot. A first sub-slot (sub-slot 0) includes PDSCH candidate #1. When the last symbol of a PDSCH candidate is included in a specific sub-slot, it may be considered that the PDSCH candidate is included in the specific sub-slot. A second sub-slot (sub-slot 1) includes PDSCH candidate #2 and PDSCH candidate #3. PDSCH candidate #1 and PDSCH candidate #2 overlap over the same symbols in the first sub-slot (sub-slot 0), whereas PDSCH candidate #3 does not overlap with other PDSCH candidates.

If the UE is able to receive only one PDSCH in one symbol, combinations of PDSCH candidates receivable by the UE in the slot in FIG. 17 are {PDSCH candidate #1}, {PDSCH candidate #2}, {PDSCH candidate #3}, {PDSCH candidate #1, PDSCH candidate #3}, and {PDSCH candidate #2, PDSCH candidate #3}. That is, in the slot shown in FIG. 17, the maximum number of PDSCH candidates concurrently receivable by the UE is two. Here, if it is assumed that 1-bit HARQ-ACK is generated and transmitted for one PDSCH candidate, it may be seen in the present embodiment that the number of HARQ-ACK bits that the UE needs to include in a semi-static HARQ-ACK codebook, for receivable PDSCH candidates in the slot, is two.

However, if the unit of the k1 value is given as a half slot, the UE generates a semi-static HARQ-ACK codebook for each half slot. An example of generating a semi-static HARQ-ACK codebook based on a half slot is shown in FIG. 18.

Figure 18:
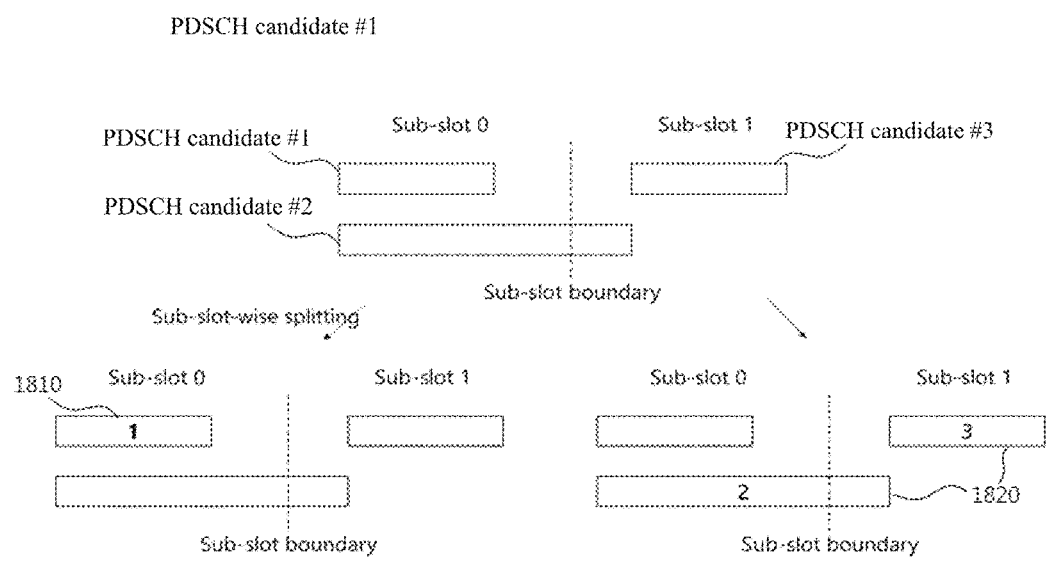
FIG. 18 is a diagram describing an example of generating a semi-static HARQ-ACK codebook based on a half slot.

Referring to FIG. 18, a PDSCH combination receivable in a first half slot (sub-slot 0) is {PDSCH candidate #1}, and therefore the number of the PDSCH combinations receivable in the first half slot (sub-slot 0) is up to one. Therefore, the UE needs to include 1-bit HARQ-ACK 1810 in the semi-static HARQ-ACK codebook for the first half slot. Subsequently, PDSCH combinations receivable in a second half slot (sub-slot 1) are {PDSCH candidate #2}, {PDSCH candidate #3}, and {PDSCH candidate #2, PDSCH candidate #3}, and therefore the number of the PDSCH combinations receivable in the second half slot (sub-slot 1) is up to two. Therefore, the UE needs to include 2-bit HARQ-ACK 1820 in the semi-static HARQ-ACK codebook, for the second half slot (sub-slot 1). As a result, a situation arises in which the UE includes, for one slot, a total of 3 bits 1810 and 1820 of HARQ-ACK in the semi-static HARQ-ACK codebook. However, as described above, up to two PDSCHs are transmittable in one slot, and therefore it may be seen that an unnecessary 1-bit overhead occurs when compared to a situation in which 2-bit HARQ-ACK is included in the semi-static HARQ-ACK codebook. Therefore, there is a need for a method for reducing such overhead.

According to the present embodiment, an HARQ-ACK codebook associated with a PDSCH may be configured to include the same number of pieces of HARQ-ACK as the maximum number of PDSCHs receivable in one slot. That is, the UE may generate an HARQ-ACK codebook including the same number of pieces of HARQ-ACK as the maximum number of PDSCHs receivable in one slot.

Figure 19:
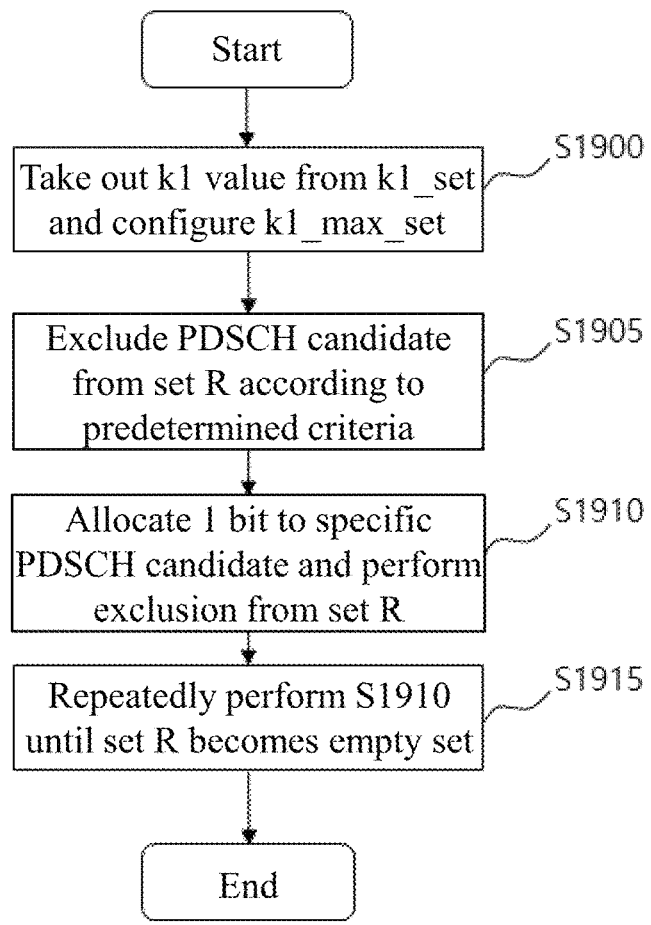
FIG. 19 illustrates generation of a semi-static HARQ-ACK codebook based on a half slot according to another example.

As an example, when the unit of the k1 value is a sub-slot (or a set of symbols) unit, the UE bundles all sub-slots included in one slot and generates a semi-static HARQ-ACK codebook by using PDSCH candidates included in the sub-slots. That is, the UE may generate a semi-static HARQ-ACK codebook to be transmitted in sub-slot n as shown in FIG. 19. The operation of FIG. 19 may correspond to the operation of the processor 110 or the communication module 120 of FIG. 11.

FIG. 19 illustrates generation of a semi-static HARQ-ACK codebook based on a half slot according to another example.

Referring to FIG. 19, the UE takes out a largest k1 value (=k1_max) from k1_set that is a set of k1 values which can be indicated by the base station. When it is assumed that an index of a slot including a sub-slot corresponding to n−(k1_max) is X, and N_subslot sub-slots are included in one slot, X is floor((n-k1_max)/N_subslot).

The UE takes out, from k1_set, k1 values indicating sub-slots included in slot X. That is, when an element of the k1 set is k1_value, the UE takes out all k1_value that satisfy X=floor((n-k1_value)/N_subslot). A set of k1 values (including k1_max) taken out in the above procedure is referred to as k1_max_set. Taking out k1 values from k1_set thereby configuring k1_max_set, as described above, is referred to as S1900.

It is assumed that a set of PDSCH candidates receivable in one slot is R. If a last symbol of a PDSCH candidate included in set R is included in one of sub-slots included in k1_max_set, the UE leaves, as it is, the PDSCH candidate in set R, otherwise, the UE excludes the PDSCH candidate from set R. In addition, when a symbol of the PDSCH candidate included in set R overlaps with a symbol configured for uplink in a semi-static UL/DL configuration, the UE excludes the PDSCH candidate from set R. Excluding the PDSCH candidate from set R according to predetermined criteria is referred to as S1905.

The UE performs the following A and B for the PDSCH candidates included in set R.

A. The UE allocates new 1 bit to a PDSCH candidate having a most preceding last symbol. If there is a PDSCH candidate overlapping the PDSCH candidate by even one symbol in set R, the UE allocates, to the overlapping PDSCH candidate, the same bit position as that of the PDSCH candidate having the most preceding last symbol. The UE excludes the PDSCH candidates (including the PDSCH candidate having the most preceding last symbol) from set R. Performing A is referred to as S1910.

B. The UE repeats A until set R becomes an empty set, in S1915.

The UE repeats S1900, S1905, and S1910 until k1_set becomes an empty set. As a result, the UE may allocate one HARQ-ACK (index 1) to PDSCH candidate #1 or PDSCH candidate #2 as shown in FIG. 20, and may allocate another HARQ-ACK (index 2) to PDSCH candidate #3.

Each of these operations according to FIG. 19 may be performed by the processor 110 of FIG. 11.

HARQ-ACK Multiplexing Indicator

According to the present embodiment, methods of configuring, transmitting, and receiving an HARQ-ACK multiplexing indicator are provided. The method of configuring an HARQ-ACK multiplexing indicator may be performed by the processor 110 of FIG. 11, the method of generating and transmitting an HARQ-ACK multiplexing indicator may be performed by the communication module 120 of FIG. 11, and the method of receiving an HARQ-ACK multiplexing indicator may be performed by the communication module 220 of FIG. 11, wherein the methods are disclosed throughout the present specification.

The UE may receive information on whether HARQ-ACK of the PDSCH should be multiplexed with other HARQ-ACK in the PDCCH (or DCI) for scheduling of the PDSCH. In the present specification, the information is referred to as an HARQ-ACK multiplexing indicator. The HARQ-ACK multiplexing indicator may be determined to 1 bit. When the HARQ-ACK multiplexing indicator is 1 bit, if the HARQ-ACK multiplexing indicator is 0, this may indicate that HARQ-ACK of the PDSCH is multiplexed with HARQ-ACK of another PDSCH and is not transmitted, and if the HARQ-ACK multiplexing indicator is 1, this may indicate that HARQ-ACK of the PDSCH is multiplexed with HARQ-ACK of another PDSCH and is transmitted.

Here, not multiplexing specific HARQ-ACK with HARQ-ACK of another PDSCH indicates that there is no HARQ-ACK information of another PDSCH in a PUCCH that is transmitted including the specific HARQ-ACK. Therefore, the PUCCH in which no HARQ-ACK has been multiplexed includes HARQ-ACK of 1 bit (or 2 bits when two transmission blocks are configured to be transmitted on the PDSCH), and the HARQ-ACK may be transmitted in one of PUCCH format 0 or PUCCH format 1 according to a bit size. On the other hand, multiplexing and transmitting specific HARQ-ACK with HARQ-ACK of another PDSCH indicates that HARQ-ACK information of another PDSCH may be included in the PUCCH that is transmitted including the specific HARQ-ACK.

When specific HARQ-ACK is multiplexed with HARQ-ACK of another PDSCH and transmitted, the UE generates an HARQ-ACK codebook by using a dynamic HARQ-ACK codebook scheme or a semi-static HARQ-ACK codebook scheme, and maps the generated HARQ-ACK codebook to the PUCCH so as to transmit the same.

Figure 21:
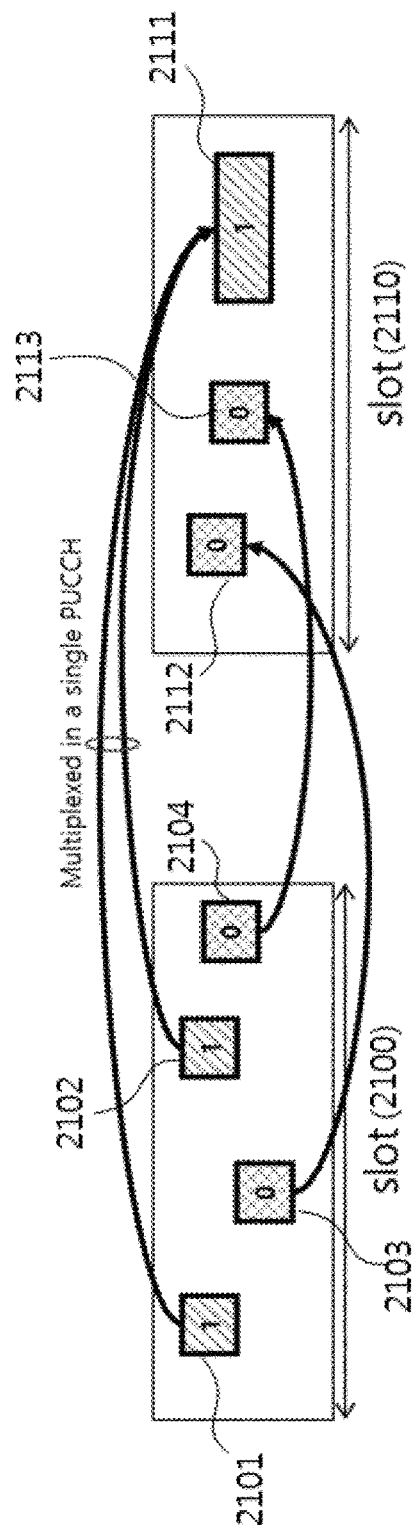
FIG. 21 illustrates PUCCH transmission by a UE according to an HARQ-ACK multiplexing indicator according to an example.

FIG. 21 illustrates PUCCH transmission by the UE according to an HARQ-ACK multiplexing indicator according to an example.

Referring to FIG. 21, the UE receives a total of four PDSCHs 2101, 2102, 2103, and 2104 in a preceding slot 2100. Each PDSCH corresponds to an HARQ-ACK multiplexing indicator of a specific value. For example, the first PDSCH 2101 and the second PDSCH 2102 may correspond to an HARQ-ACK multiplexing indicator value of 1, and the third PDSCH 2103 and the fourth PDSCH 2104 may correspond to an HARQ-ACK multiplexing indicator value of 0.

HARQ-ACK information of two PDSCHs 2101 and 2102 having the HARQ-ACK multiplexing indicator value of 1 is transmitted via one PUCCH 2111. HARQ-ACK of two PDSCHs 2103 and 2104 having the HARQ-ACK multiplexing indicator value of 0 are transmitted via different PUCCH resources 2112 and 2113, respectively.

Here, PUCCH resources associated with the PDSCHs 2103 and 2104 having the HARQ-ACK multiplexing indicator value of 0 are indicated via PRI values for scheduling of the PDSCHs 2103 and 2104. If PUCCHs which transmit HARQ-ACK of different PDSCHs having the HARQ-ACK multiplexing indicator value of 0 (multiplexing with HARQ-ACK of another PDSCH is not possible) overlap in the same symbol, concurrent transmission is impossible. In this case, a method of processing the PUCCHs is as follows.

As an example, the UE may multiplex HARQ-ACK information of PUCCHs into one PUCCH and transmit the same.

As another example, the UE transmits the PUCCH of the PDSCH by prioritizing HARQ-ACK of the PDSCH (that is, when the PDCCH for scheduling the PDSCH starts late or ends late) scheduled later, and drops overlapping the other PUCCH without transmission.

As another example, the UE may not expect the two PUCCHs to overlap in one symbol.

As another example, even if 0 (multiplexing with HARQ-ACK of another PDSCH is impossible) has been indicated as the HARQ-ACK multiplexing indicator value, the UE may be configured so that HARQ-ACK multiplexing is partially possible. For example, when two PDSCHs 2103 and 2104, in which 0 has been indicated as the HARQ-ACK multiplexing indicator value, are indicated to be transmitted in the same PUCCH resource (or if the two PDSCHs have the same PRI value, or overlap in at least one symbol), HARQ-ACK of the two PDSCHs 2103 and 2104 are multiplexed and transmitted. In this case, the HARQ-ACK bit of the PDSCH scheduled later is located subsequent to the HARQ-ACK bit of the PDSCH scheduled earlier. This is shown in FIG. 22.

Figure 22:
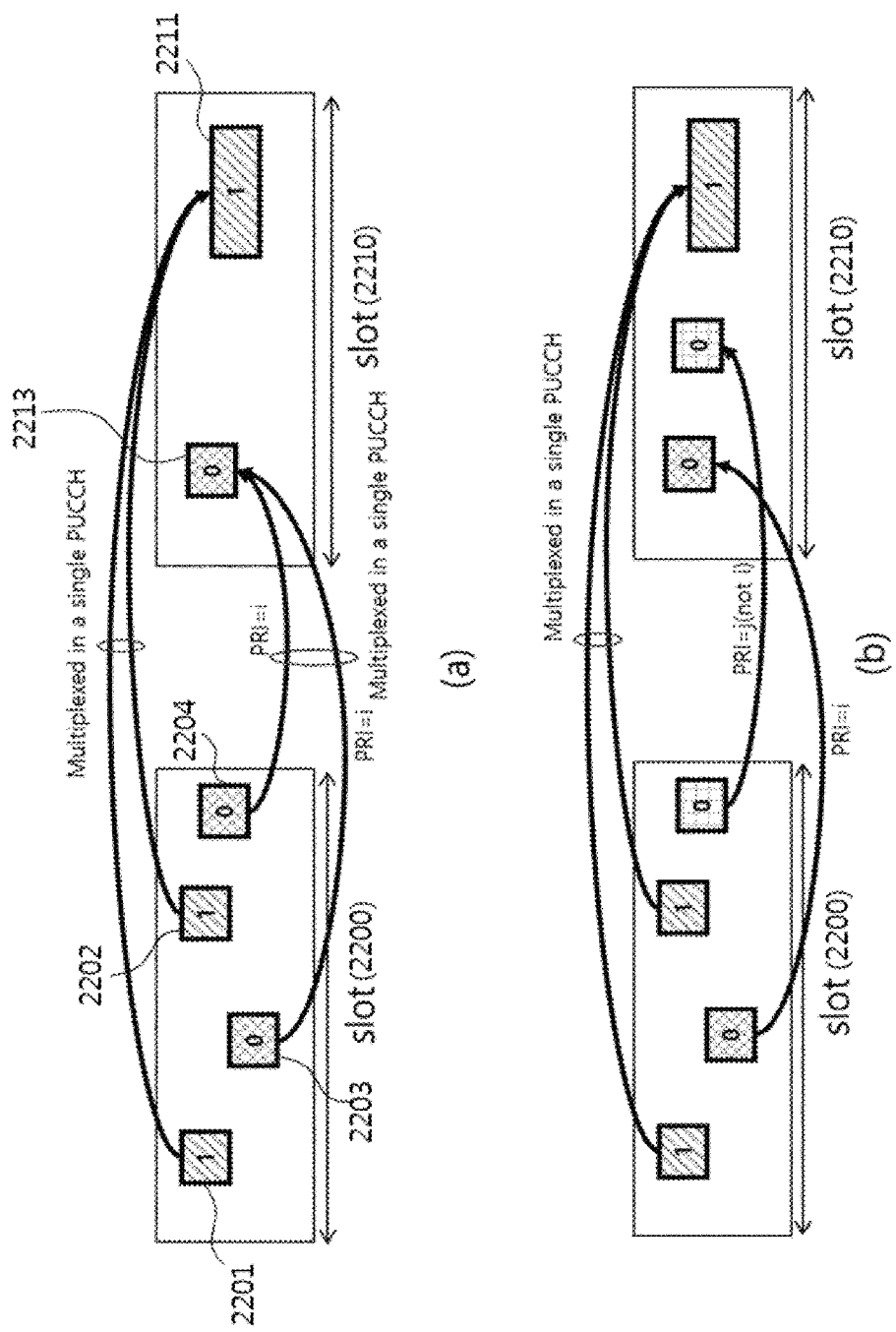
FIG. 22 illustrates PUCCH transmission of the UE according to an HARQ-ACK multiplexing indicator according to another example.

FIG. 22 illustrates PUCCH transmission by the UE according to an HARQ-ACK multiplexing indicator according to another example.

First, referring to (a) in FIG. 22, even if the HARQ-ACK multiplexing indicator values associated with the third and fourth PDSCHs 2103 and 2104 are indicated to be 0 in the preceding slot 2200 (i.e., disable of multiplexing), if the PRI values of the third and fourth PDSCHs 2103 and 2104 are equal to i, the UE may transmit HARQ-ACK of the two PDSCHs in a PUCCH resource corresponding to PRI=i.

Referring to (b) in FIG. 22, when the HARQ-ACK multiplexing indicator values associated with the third and fourth PDSCHs 2103 and 2104 are indicated to be 0 in the preceding slot 2200, if the PRI values of the third and fourth PDSCHs 2103 and 2104 are not the same (i and j), the UE may transmit each piece of HARQ-ACK information in a PUCCH resource corresponding to each PRI value.

The PUCCH resources for transmitting HARQ-ACK of PDSCHs having the HARQ-ACK multiplexing indicator value of 1 and the PUCCH resources transmitting HARQ-ACK of the PDSCHs having the HARQ-ACK multiplexing indicator value of 0 may overlap. In this case, the UE may transmit PUCCH in the following way.

As an example, the UE always preferentially transmits a PUCCH for transmitting HARQ-ACK of PDSCHs having the HARQ-ACK multiplexing indicator value of 0 and may drop a PUCCH for transmitting HARQ-ACK of the PDSCHs having the HARQ-ACK multiplexing indicator value of 1.

As another example, if the last symbol of the PUCCH for transmitting HARQ-ACK of the PDSCHs having the HARQ-ACK multiplexing indicator value of 1 ends before or ends at the same time as the last symbol of the PUCCH for transmitting HARQ-ACK of PDSCHs having the HARQ-ACK multiplexing indicator value of 0, the UE may attach an HARQ-ACK bit of the PDSCH having the HARQ-ACK multiplexing indicator value of 0 to an HARQ-ACK bit of the PDSCHs having the HARQ-ACK multiplexing indicator value of 1, and may transmit the same in the PUCCH resource of the PDSCHs having the HARQ-ACK multiplexing indicator value of 1.

In the present specification, the HARQ-ACK multiplexing indicator is expressed to be 1 bit for convenience and has been described as being explicitly transmitted. However, the HARQ-ACK multiplexing indicator may be implicitly indicated as follows.

As an example, the UE may determine an HARQ-ACK multiplexing indicator on the basis of an RNTI scrambled to PDCCH. For example, if a PDCCH (or DCI) for scheduling of a PDSCH is scrambled with C-RNTI, the UE may determine that an HARQ-ACK multiplexing indicator of the PDSCH has a value of 1 (that is, being able to be multiplexed with HARQ-ACK information of another PDSCH). On the other hand, if the PDCCH (or DCI) for scheduling of the PDSCH is scrambled with an RNTI (e.g., RNTI for a URLLC service) other than a C-RNTI, the UE may determine that the HARQ-ACK multiplexing indicator of the PDSCH has a value of 0 (that is, being unable to be multiplexed with HARQ-ACK of another PDSCH).

As an example, the UE may determine an HARQ-ACK multiplexing indicator on the basis of a k1 value included in the PDCCH (or DCI). Here, the k1 value indicates a time interval between a scheduled PDSCH and HARQ-ACK of the PDSCH or timing of the PDSCH and the HARQ-ACK. Therefore, for a PDSCH for a URLLC service, it is generally necessary to quickly indicate or transmit HARQ-ACK. Therefore, if the k1 value is smaller than a predetermined specific k1 value, the UE may determine that the HARQ-ACK multiplexing indicator is 0. On the other hand, if the k1 value is larger than or equal to the predetermined specific k1 value, the UE may determine that the HARQ-ACK multiplexing indicator is 1. Here, the predetermined specific k1 value may be determined in units of slots (e.g., 1 slot or 2 slots), may be determined in units of sub-slots, or may be determined in units of absolute times (e.g., 0.5 ms or 0.25 ms). Alternatively, when a specific k1' value is indicated from among multiple k1 values, the UE may determine an HARQ-ACK multiplexing indicator value to be 0. That is, when the UE receives an indication of the k1' value, the UE transmits only HARQ-ACK for one PDSCH without multiplexing of an HARQ-ACK codebook.

As another example, the UE may determine the HARQ-ACK multiplexing indicator on the basis of a modulation and coding scheme (MCS) value. Here, the MCS value indicates a code rate of a scheduled PDSCH. In general, high reliability is required for the PDSCH of a URLLC service. Therefore, if the code rate value is lower than a specific code rate value, the UE may determine that the HARQ-ACK multiplexing indicator is 0. On the other hand, if the code rate value is larger than or equal to the specific code rate value, the UE may determine that the HARQ-ACK multiplexing indicator is 1. Alternatively, the UE may determine the HARQ-ACK multiplexing indicator on the basis of an MCS table used by the PDCCH (or DCI). When a specific PDCCH (or DCI) uses an MCS table that provides higher reliability (lower code rate), the UE may determine that the HARQ-ACK multiplexing indicator value of the PDCCH (or DCI) is 0.

As another example, the UE may determine that, as a combination of specific values indicated by other fields transmitted via DCI, the HARQ-ACK multiplexing indicator is 0 or 1.

As another example, the UE may determine the HARQ-ACK multiplexing indicator value on the basis of a search space (or CORESET) in which the PDCCH (or DCI) is detected. For example, the base station may separately instruct a search space (or CORESET) for URLLC transmission to the UE. If the UE receives the PDCCH (or DCI) in the search space (or CORESET), the UE may determine that the HARQ-ACK multiplexing indicator value is 0. On the other hand, if the UE receives the PDCCH (or DCI) in a search space (or CORESET) other than the search space (or CORESET), the UE may determine that the HARQ-ACK multiplexing indicator value is 1.

Alternatively, the UE may distinguish the search space (or CORESET) without a separate explicit indication from the base station. For example, if a monitoring period of the search space (or CORESET) is shorter than a specific period, it may be determined that the search space (or CORESET) is a search space (or CORESET) for URLLC transmission. The specific period may be, for example, one slot.

As another example, the UE may determine the HARQ-ACK multiplexing indicator value on the basis of a control channel element (CCE) aggregation level of a PDCCH received from the base station. For example, if the CCE aggregation level exceeds a specific value, the UE may determine that the HARQ-ACK multiplexing indicator value of the PDCCH is 0. Here, the specific CCE aggregation level value may be determined to be 8 or 16. If the CCE aggregation level is smaller than or equal to a specific value, the UE may determine that the HARQ-ACK multiplexing indicator value of the PDCCH is 1.

As another example, the UE may determine the HARQ-ACK multiplexing indicator value on the basis of a DCI format (or length of DCI). For example, if compact DCI is configured for the UE, the UE may determine that the HARQ-ACK multiplexing indicator value of the PDSCH scheduled via the compact DCI is 0. On the other hand, if no compact DCI is configured for the UE, the UE may determine that the HARQ-ACK multiplexing indicator value of PDSCH scheduled via corresponding DCI is 1. Here, the compact DCI is a DCI format for scheduling of URLLC PDSCH, and may be smaller than a payload size of fallback DCI (DCI format 0_0/1_0).

As another example, the UE may determine the HARQ-ACK multiplexing indicator value on the basis of a PUCCH resource indicator (PRI) value. Here, a PRI included in PUCCH (or DCI) so as to be transmitted indicates a PUCCH resource that is to be used by the UE from among PUCCH resources configured by the base station. If a predetermined specific value is indicated from among PRI values, the UE may determine that the HARQ-ACK multiplexing indicator value is 0. This is because all the configured PUCCH resources are not suitable for transmitting URLLC HARQ-ACK. For example, since a PUCCH resource for transmitting HARQ-ACK information of 2 bits or less from among PUCCH resources is suitable for transmitting URLLC HARQ-ACK, if a PRI indicating the PUCCH resource is received, the UE may determine that the HARQ-ACK multiplexing indicator value is 0. Conversely, since a PUCCH resource exceeding 2-bit HARQ-ACK information from among PUCCH resources is not suitable for transmitting the URLLC HARQ-ACK, if a PRI indicating the PUCCH resource is received, the UE may determine that the HARQ-ACK multiplexing indicator value is 1.

As another example, the UE may determine the HARQ-ACK multiplexing indicator value on the basis of an HARQ process number. For example, when a predetermined specific value is indicated for the UE from among HARQ process numbers, the UE may determine that the HARQ-ACK multiplexing indicator value is 0, and may transmit only HARQ-ACK for one PDSCH.

As another example, the UE may determine the HARQ-ACK multiplexing indicator value on the basis of a PDSCH group indicator value. The PDSCH group indicator is used to concurrently transmit multiple PUCCHs in one slot. In this case, multiple HARQ-ACK bits may be multiplexed on the same PUCCH resource. If the UE receives a specific value from among PDSCH group indicators, the UE may determine that the HARQ-ACK multiplexing indicator value is 0, and may transmit only HARQ-ACK for one PDSCH.

Method of Deriving k1 Value

The present embodiment discloses a method of deriving or interpreting a k1 value by the UE. The k1 value is an interval between a slot in which the scheduled PDSCH ends and a slot in which HARQ-ACK is transmitted, or the number of slots (or the number of specific units (sub-slots) smaller than slots). However, the UE actually needs a processing time until the UE receives and decodes a PDSCH, and generates a PUCCH for transmitting HARQ-ACK. Therefore, a specific k1 value, for example, k1=0, is a value that the UE cannot process realistically. Therefore, the k1 value of 0 is a value that cannot be indicated to the UE. Accordingly, the present embodiment discloses a method of defining a k1 value except for a value that cannot be indicated to the UE due to a processing time as described above.

As an example, the UE may determine the k1 value except for slots completely included between a last symbol of the PDSCH and a PDSCH processing time ($T_{proc,1}$). Slots excluded from the above are referred to as invalid slots. That is, the k1 value according to the present embodiment may be defined to be the number of valid slots remaining after excluding invalid slots from among slots between a slot in which a scheduled PDSCH ends and a slot in which PUCCH for transmission of HARQ-ACK is transmitted.

As another example, the UE may determine the k1 value except for a slot configured as a semi-static DL symbol by a higher layer. For example, the UE excludes, when determining the k1 value, a slot including only semi-static DL symbols. Alternatively, the UE may exclude, when determining the k1 value, a slot in which all PUCCH transmissions are impossible due to semi-static DL symbols.

The invalid slot may include slots in which a PUCCH resource indicated by a PRI and the semi-static DL symbol overlap so that the PUCCH cannot be transmitted. In this case, the k1 value may be defined to be the number of slots remaining after excluding invalid slots from among slots between the slot in which the scheduled PDSCH ends and the slot in which the PUCCH for transmission of HARQ-ACK is transmitted.

This method of deriving or interpreting the k1 value may be performed by the processor 110 of FIG. 11.

Method of Determining PUCCH Resource when k1 or PRI Field is not Indicated to UE In a PDCCH (or DCI) for scheduling of URLLC, a k1 or PRI field may not be configured for the purpose of reducing DCI overhead (or payload size of DCI). Accordingly, the present embodiment discloses a method for determining a PUCCH resource when a k1 or PRI field is not configured in DCI.

As an example, when a k1 field (or PDSCH-to-HARQ_feedback timing indicator field) for the UE is not configured (or indicated), a slot including a PUCCH resource of the UE may be determined to be a slot in which subsequent (indicated by PRI) PUCCH transmission is possible, except for slots completely included between a last symbol of the PDSCH and a PDSCH processing time ($T_{proc,1}$).

As another example, when the k1 field for the UE is not configured (or indicated), the slot including the PUCCH resource of the UE may be determined to be a slot that does not overlap with a symbol indicated by a PRI and a semi-static DL symbol.

As another example, when no PRI field for the UE is configured (or indicated), the PUCCH resource of the UE may be determined to be a PUCCH resource that ends earliest from among PUCCH resources configured in the slot indicated by k1.

As another example, when no PRI field for the UE is configured (or indicated), the PUCCH resource of the UE may be determined to be a PUCCH resource that ends earliest from among PUCCH resources except for a PUCCH that does not satisfy the PDSCH processing time ($T_{proc,1}$) in the slot indicated by k1. Here, a PUCCH resource overlapping the semi-static DL symbol may be excluded.

Figure 23:
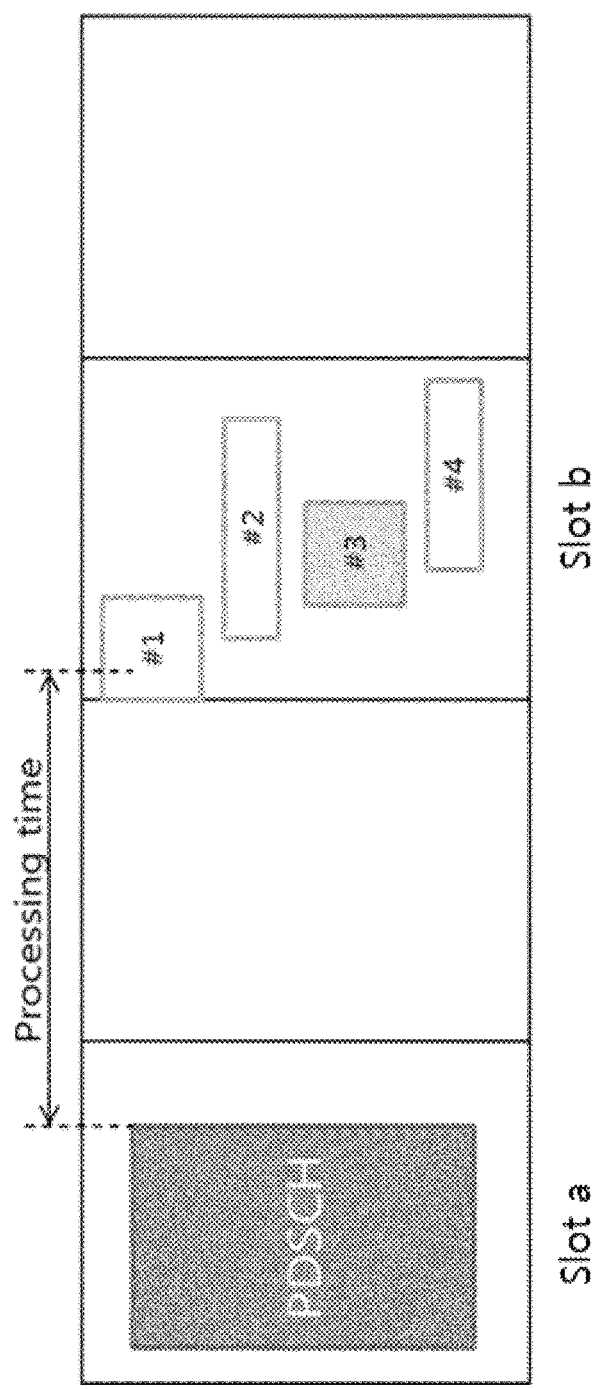
FIG. 23 is a diagram describing a method of determining a PUCCH resource when k1 and PRI fields are not included (or indicated) in the UE according to an example.

FIG. 23 is a diagram describing a method of determining a PUCCH resource when k1 and PRI fields are not included (or indicated) in the UE according to an example.

Referring to FIG. 23, a total of four PUCCH resources (#1, #2, #3, and #4) are configured in slot b for a PDSCH of slot a. Among them, PUCCH resource #1 may be excluded from the PUCCH resources for the UE due to failing to satisfy a processing time condition. In addition, a PUCCH resource that ends earliest from among PUCCH resources #2, #3, and #4 is #3, and therefore the UE may determine PUCCH resource #3 as a PUCCH resource for transmission of HARQ-ACK associated with PDSCH.

The method of determining a PUCCH resource may be performed by the processor 110 of FIG. 11.

Method of Transmitting HARQ-ACK Associated with SPS PDSCH

A minimum period that a semi-persistent scheduled (SPS) PDSCH may have in a Release 15 NR system is 10 ms. In addition, an interval between a PUCCH transmission slot and a PDSCH transmission slot for HARQ-ACK transmission can be up to 16 slots. According to this configuration, it is impossible to transmit HARQ-ACK of two or more SPS PDSCHs in one PUCCH transmission slot. However, in Release 16, for a downlink URLLC service, SPS PDSCH transmission having a period shorter than 10 ms has been enhanced. In this case, a situation in which the UE transmits HARQ-ACK of two or more SPS PDSCHs in one PUCCH transmission slot may occur. Therefore, a method of transmitting, by the UE, HARQ-ACK bits associated with multiple SPS PDSCHs in one slot should be clearly defined.

The present embodiment may include receiving an SPS PDSCH in a first slot by the UE, and if HARQ-ACK associated with the SPS PDSCH cannot be transmitted in a second slot that is a slot after k1 slots from the first slot, delaying transmission timing of HARQ-ACK associated with the SPS PDSCH until a third slot.

This will be described in more detail as follows. DCI for activation of the SPS PDSCH may include one k1 value. Here, the k1 value is a value indicated by an HARQ feedback timing indicator field from the PDSCH, and indicates an interval or a slot difference between a slot in which the PDSCH is transmitted and a slot in which the PUCCH is transmitted.

The UE is scheduled to transmit a PUCCH including HARQ-ACK in slot n+k1 that is lagged behind by the k1 value from slot n in which the SPS PDSCH is transmitted. However, slot n+k1 lagged behind by the k1 value from slot n in which the SPS PDSCH is transmitted may not always be a slot in which PUCCH transmission is possible. For example, in a TDD system, a situation in which slot n+k1 lagged behind by the k1 value from slot n in which the SPS PDSCH is transmitted overlaps with a DL symbol may occur. In this case, the UE cannot transmit HARQ-ACK associated with SPS PDSCH in slot n+k1.

Figure 24:
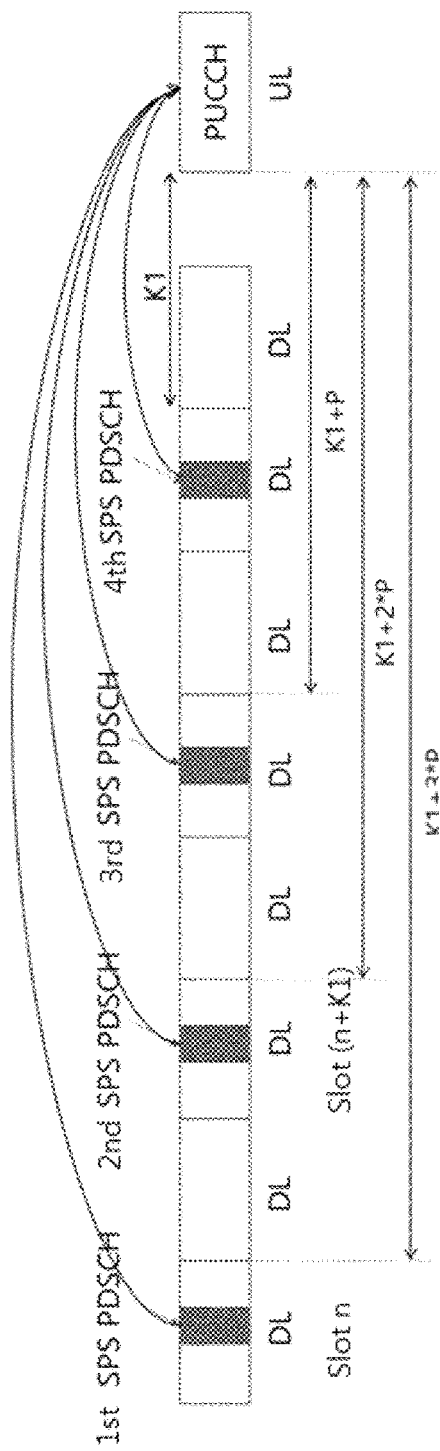
FIG. 24 is a diagram describing a method of transmitting, by the UE, HARQ-ACK bits associated with multiple SPS PDSCHs in one slot according to an example.

FIG. 24 is a diagram describing a method of transmitting, by the UE, HARQ-ACK bits associated with multiple SPS PDSCHs in one slot according to an example.

Referring to FIG. 24, if first SPS PDSCH transmission is scheduled in slot n, and PUCCH transmission associated with a first SPS PDSCH is impossible in slot n+k1, the UE postpones transmission timing of HARQ-ACK associated with the first SPS PDSCH to slot n+P+k1. If PUCCH transmission is possible in slot n+P+k1, the UE may transmit HARQ-ACK of the SPS PDSCH. However, if PUCCH transmission is impossible even in slot n+P+k1, the UE cannot transmit HARQ-ACK of the first SPS PDSCH. In this case, the UE postpones the transmission timing of HARQ-ACK for the first SPS PDSCH to slot n+2P+k1 again. With this pattern, the UE may continuously postpone, by P, the transmission timing of HARQ-ACK for the first SPS PDSCH. Here, P may be determined to be, for example, the same value as a period of the SPS PDSCH.

As an example, if PUCCH transmission is possible in slot n+P+k1, the UE may multiplex and transmit HARQ-ACK for SPS PDSCH which has not been transmitted before and HARQ-ACK for an SPS PDSCH received in slot n+P. That is, the UE may transmit a PUCCH including HARQ-ACK in a nearest slot capable of transmitting a PUCCH including HARQ-ACK among slots from slot n, to which the SPS PDSCH is allocated, to slots n+i*P+k1 (i=0,1, . . . ).

As another example, the base station may indicate multiple k1 values to transmit HARQ-ACK of the SPS PDSCH to the UE. When the UE receives multiple K1 values (e.g., both k1_1 and k1_2) from the base station, the method of transmitting HARQ-ACK is as follows. When a slot in which the SPS PDSCH is received is slot n, if a PUCCH can be transmitted in n+k1_1, transmission is performed. If the PUCCH cannot be transmitted in n+k1_1, the PUCCH is transmitted in n+k1_2.

As another example, the base station may indicate multiple k1 values to transmit HARQ-ACK of the SPS PDSCH to the UE. A first k1 value among the multiple k1 values is applied to the first SPS PDSCH, and a second k1 value is applied to a second SPS PDSCH. That is, if the number of configured k1 values is T, an M-th k1 value may be applied to an (i*T+M)th SPS PDSCH.

According to the present embodiment, reception of the SPS PDSCH by the UE and postponing HARQ-ACK associated with the SPS PDSCH by i*P and then transmitting the same may be performed by the communication module 120 of FIG. 11, and transmission of SPS PDSCH by the base station and postponing HARQ-ACK associated with the SPS PDSCH by i*P and then receiving the same may be performed by the communication module 220 of FIG. 11.

Method of Configuring Payload of Reduced DCI

The present embodiment is a method of reducing a payload size of DCI. A k1 or PRI field may be excluded to reduce DCI overhead, and other fields may also be excluded in a similar manner. Alternatively, only some of options indicated by a DCI field may be included. Here, if only some of options that the DCI field can indicate (e.g., N options) are included, a bit size of the DCI field becomes ceil (log 2 (N)). However, if N does not appear as a power of 2, $2^X$–N code points of the corresponding DCI field cannot be used. Here, X is a smallest value among integers that satisfy a condition that $2^X$ is larger than or equal to N. Therefore, in order to more efficiently use the remaining code points, a method of joint encoding different DCI fields may be used.

As an example, it is assumed that a j-th DCI field includes Y(j) options (a zeroth option, a first option, . . . , a Y(j)th option). Here, a sequence of options is numbered from zeroth. That is, a most preceding option is the zeroth option. When DCI is received from the base station, the UE may obtain an option number in the j-th DCI field by using the following equation.

$$\text{Field}(j) = \text{floor}(X/Z(j)) \bmod Y(j) \quad \text{[Equation 1]}$$

Referring to Equation 1, $X = \sum_{k=0}^{DCI\_length-1} 2^{b_k}$, $Z(j) = \prod_{n=0}^{j-1} Y(j)$ for $j>1$, and $Z(1)=1$ for $j=1$. DCI_length is the length of DCI, and $b_k$ is a binary representation of received DCI. That is, from Equation 1, an option (Field(j)th option) corresponding to Field(j) in the j-th DCI may be selected.

For example, Table 3 below shows a case in which DCI includes three fields, and each field includes three options. If bits required for each field in the DCI are 2 bits, since there are a total of 3 fields, a total of 6 bits are required for these fields. However, according to the present embodiment, all options of three fields may be expressed with only 5 bits. In Table 3, code points 11011 to 11111 may be reserved.

TABLE 3

| X (binary) | X (decimal) | First field Y(1) = 3, Z(1) = 1, floor (X/Z(1)) mod Y(1) = floor (X/1) mod 3 | Second field Y(2) = 3, Z(2) = 3, floor (X/Z(2)) mod Y(2) = floor (X/3) mod 3 | Third field Y(3) = 3, Z(3) = 9, floor (X/Z(3)) mod Y(3) = floor (X/9) mod 3 |
|---|---|---|---|---|
| 00000 | 0 | 0 | 0 | 0 |
| 00001 | 1 | 1 | 0 | 0 |
| 00010 | 2 | 2 | 0 | 0 |
| 00011 | 3 | 0 | 1 | 0 |
| 00100 | 4 | 1 | 1 | 0 |
| 00101 | 5 | 2 | 1 | 0 |
| 00110 | 6 | 0 | 2 | 0 |
| 00111 | 7 | 1 | 2 | 0 |
| 01000 | 8 | 2 | 2 | 0 |
| 01001 | 9 | 0 | 0 | 1 |
| 01010 | 10 | 1 | 0 | 1 |
| 01011 | 11 | 2 | 0 | 1 |

TABLE 3-continued

| X (binary) | X (decimal) | First field Y(1) = 3, Z(1) = 1, floor (X/Z(1)) mod Y(1) = floor (X/1) mod 3 | Second field Y(2) = 3, Z(2) = 3, floor (X/Z(2)) mod Y(2) = floor (X/3) mod 3 | Third field Y(3) = 3, Z(3) = 9, floor (X/Z(3)) mod Y(3) = floor (X/9) mod 3 |
|---|---|---|---|---|
| 01100 | 12 | 0 | 1 | 1 |
| 01101 | 13 | 1 | 1 | 1 |
| 01110 | 14 | 2 | 1 | 1 |
| 01111 | 15 | 0 | 2 | 1 |
| 10000 | 16 | 1 | 2 | 1 |
| 10001 | 17 | 2 | 2 | 1 |
| 10010 | 18 | 0 | 0 | 2 |
| 10011 | 19 | 1 | 0 | 2 |
| 10100 | 20 | 2 | 0 | 2 |
| 10101 | 21 | 0 | 1 | 2 |
| 10110 | 22 | 1 | 1 | 2 |
| 10111 | 23 | 2 | 1 | 2 |
| 11000 | 24 | 0 | 2 | 2 |
| 11001 | 25 | 1 | 2 | 2 |
| 11010 | 26 | 2 | 2 | 2 |
| 11011 | 27 | — | — | — |
| 11100 | 28 | — | — | — |
| 11101 | 29 | — | — | — |
| 11110 | 30 | — | — | — |
| 11111 | 31 | — | — | — |

Referring to Table 3, for example, when 01100 (binary) is indicated by DCI to the UE, Field(1)=0, Field(2)=1, and Field(3)=1 may be obtained. That is, it may be seen that Field(1) which is a first field of DCI is indicated as the zeroth option, Field(2) which is a second field of DCI is indicated as the first option, and Field(3) which is a third field of DCI is indicated as the first option.

Hereinafter, a method of determining the length of a DCI format is disclosed. In a Release 15 NR system of 3GPP, for example, DCI formats of different lengths may be defined as follows.

1) Fallback DCI (DCI formats 0_0 and 1_0) in a common search space
2) Fallback DCI (DCI formats 0_0 and 1_0) in a UE-specific search space
3) Non-fallback DCI (DCI format 0_1) for scheduling of PUSCH
4) Non-fallback DCI (DCI format 1_1) for scheduling of PDSCH However, the UE may decode DCI formats having up to three different lengths, but may not concurrently decode four DCI formats having different lengths. Therefore, when the lengths of all of four DCIs according to 1) to 4) are different from each other, it is required to match to the lengths of other DCI formats by increasing or decreasing the lengths of some DCI formats. For example, if the lengths of all of four DCI formats are different, the base station may match the fallback DCI in the UE-specific search space to have the same length as the length of the fallback DCI in the common search space.

More specifically, the fallback DCI in the UE-specific search space and the fallback DCI in the common search space may have different lengths of a frequency domain resource assignment (FDRA) field. The length of the FDRA field of the fallback DCI in the common search space is determined according to the size of CORESET #0 configured in a cell initial access operation and the size of an initial DL BWP configured via system information (SIB1). However, the length of the FDRA field of the fallback DCI in the UE-specific search space is determined according to an active DL BWP. According to the present embodiment, in order to match the fallback DCI in the UE-specific search space with the length of the fallback DCI in the common search space, the base station may truncate a most significant bit (MSB) of the FDRA field of the fallback DCI in the UE-specific search space.

For reference, the base station may configure the length of the non-fallback DCI (DCI format 0_1) for scheduling of a PUSCH and the non-fallback DCI (DCI format 1_1) for scheduling of the PDSCH for the UE via RRC signaling. Here, the length of the non-fallback DCI for scheduling of the PUSCH and the non-fallback DCI for scheduling of the PDSCH may be configured to be the same. If the length of the non-fallback DCI (DCI format 0_1) for scheduling of the PUSCH and the non-fallback DCI (DCI format 1_1) for scheduling of the PDSCH are the same, the DCI formats include a 1-bit indicator. That is, in the non-fallback DCI for scheduling of the PUSCH, the 1-bit indicator has a value of 0, and in the non-fallback DCI for scheduling of the PDSCH, the 1-bit indicator has a value 1. More specifically, a method of determining DCI formats of up to three different lengths in Release 15 is as follows.

A first operation includes determining the length of the fallback DCI (DCI formats 0_0 and 1_0) in the common search space by the UE or the base station. Specifically, the UE or the base station determines the length of DCI format 0_0 on the basis of an initial UL BWP, and determines the length of DCI format 1_0 on the basis of the size of CORESET #0 (if no initial DL BWP has been configured) or determines the length of DCI format 1_0 on the basis of the initial DL BWP (if the initial DL BWP has been configured). If the lengths of DCI format 0_0 and DCI format 1_0 are different, the UE or the base station truncates or performs zero-padding of MSBs of an FDRA field of DCI format 0_0 so as to match the length of DCI format 0_0 to the length of DCI format 1_0.

A second operation includes determining the length of the fallback DCI (DCI formats 0_0 and 1_0) in the common search space by the UE or the base station. Specifically, the UE or the base station determines the length of DCI format 0_0 on the basis of an activated UL BWP, and determines the length of DCI format 1_0 on the basis of an activated DL BWP. If the lengths of DCI format 0_0 and DCI format 1_0 are different, the UE or the base station truncates or performs zero-padding of the MSBs of the FDRA field of DCI format 0_0 so as to match the length of DCI format 0_0 to the length of DCI format 1_0.

A third operation includes determining the lengths of the non-fallback DCI (DCI format 01) for scheduling of the PUSCH and the non-fallback DCI (DCI format 1_1) for scheduling of the PDSCH. If the length of DCI format 0_1 is the same as the length of the fallback DCI (DCI formats 0_0 and 1_0) in the UE-specific search space, the UE or the base station inserts "0" of a 1-bit length into the non-fallback DCI (DCI format 0_1) for scheduling of the PUSCH. If the length of DCI format 1_1 is the same as the length of the fallback DCI (DCI formats 0_0 and 1_0) in the UE-specific search space, the UE or the base station inserts "0" of a 1-bit length into the non-fallback DCI (DCI format 0_1) for scheduling of the PDSCH.

A fourth operation includes checking the lengths of the DCI formats adjusted by the UE or the base station according to the first to third operations. If there are three or fewer different lengths among all DCI, the UE is able to perform decoding, and therefore the lengths are no longer matched. Conversely, if the number of different lengths exceeds three, the lengths are additionally adjusted via a fifth operation.

The fifth operation includes adjusting the lengths of DCI formats to three by the UE or the base station. To this end, the UE or the base station may exclude 1 bit added in the third operation. The UE or the base station changes the length of the FDRA field of the fallback DCI (DCI formats 0_0 and 1_0) in the UE-specific search space. Specifically, the UE or the base station may determine the length of DCI format 1_0 on the basis of the size of CORESET #0 (if no initial DL BWP has been configured), and may determine the length of DCI format 1_0 on the basis of the initial DL BWP (if the initial DL BWP has been configured). The UE or the base station determines the length of DCI format 0_0 on the basis of the initial UL BWP. If the lengths of DCI format 0_0 and DCI format 1_0 are different, the UE or the base station truncates or performs zero-padding of the MSBs of the FDRA field of DCI format 0_0 so as to match the length of DCI format 0_0 to the length of DCI format 1_0.

The first to fifth operations as described above may be performed by the processor 110 or the processor 210 of FIG. 11.

According to another embodiment of the present specification, the UE or the base station may configure a DCI format of a new length in order to support a new URLLC service. This is referred to as compact DCI for convenience. The length of each field of compact DCI may be configured via RRC signaling. Therefore, according to the configuration via RRC signaling, the length of the compact DCI may be configured to be less than the length of Release 15 fallback DCI by 16 bits, may be configured to be the same as the length of the Release 15 fallback DCI, and may be configured to be longer than the length of the Release 15 fallback DCI. According to the present embodiment, DCI formats of two new lengths may be defined as follows.

5) Compact DCI for scheduling of PUSCH
6) Compact DCI for scheduling of PDSCH

In order to decode the DCI formats of 1), 2), 3), 4), 5), and 6) having different lengths, the UE needs to match the lengths of the DCI formats.

First, it is assumed that the UE supporting a URLLC service of Release 16 may concurrently receive DCI formats having three different lengths. In such a situation, a method of adjusting or matching the lengths of DCI according to the present embodiment is as follows.

As an example, the UE first matches the sizes of Release 15 DCI formats. That is, the UE determines DCI formats of up to three different lengths over the first to fifth operations described above. Thereafter, the UE determines the length of compact DCI as follows.

If there are three DCI formats of Release 15, which have different lengths, compact DCI for scheduling of the PUSCH and compact DCI for scheduling of the PDSCH may be configured to have one length among the previously determined lengths of the DCI formats of Release 15.

In one aspect, when configuring the compact DCI for the UE via RRC signaling, the base station may directly inform about the length that a compact DCI format should have.

In another aspect, when configuring the compact DCI for the UE via RRC signaling, the base station may inform about the length of the compact DCI by indicating another DCI format having the same length as that of the compact DCI. For example, RRC signaling is 2 bits, wherein, if a value of RRC signaling is 00, the fallback DCI (DCI formats 0_0 and 1_0) in the common search space is indicated, if the value is 01, the fallback DCI (DCI formats 0_0 and 1_0) in the UE-specific search space is indicated, if the value is 10, the non-fallback DCI (DCI format 0_1) for scheduling of the PUSCH is indicated, and if the value is 11, the non-fallback DCI (DCI format 1_1) for scheduling of the PDSCH is indicated. That is, the length of the compact DCI may have the same length as that of other DCI formats indicated via the RRC signaling.

In another aspect, when configuring the compact DCI for the UE via RRC signaling, the base station may indicate an index corresponding to the same length as that of the compact DCI from among length indexes that other DCI formats may have. For example, a lowest index value (for example, "0" when length indexes of other DCI formats are given as 0, 1, and 2) of the RRC signaling corresponds to a DCI format of a shortest length, and a highest index value (for example, "2" when length indexes of other DCI formats are given as 0, 1, and 2) corresponds to a DCI format of a longest length.

In another aspect, the UE may not receive the length of the compact DCI via separate RRC signaling. That is, the UE may determine the length of the entire compact DCI on the basis of the length of each field of the compact DCI. Specifically, it is assumed that the lengths of the Release 15 DCI formats are given as A, B, and C. Here, it is assumed that A<B<C, and X be a sum of the length of each field of the compact DCI. Then, the length of the compact DCI is determined to be a shortest length among Release 15 DCI formats longer than X. If there is no Release 15 DCI format longer than X, the length of the compact DCI is matched to the length of a longest Release 15 DCI format. For example, if A<X<B, (B−X) bits are added to the compact DCI, thereby matching the length thereof to B bits. If C<X, (X−C) bits are excluded from the compact DCI, thereby matching the length thereof to C bits.

As described above, indicating or configuring the length of the compact DCI via RRC signaling may be performed by the communication module 220 of FIG. 11.

A method of adjusting the length of the compact DCI by the UE is as follows.

The UE determines the length of the compact DCI according to the RRC signaling. If the sum of the lengths of all fields of the compact DCI is smaller than the length of the DCI format configured via the RRC signaling, the UE may fill in insufficient bits. All values to be filled herein may be 0 or may be given as a CRC value. On the other hand, if the sum of the lengths of all fields of the compact DCI is greater than the length of the DCI format configured via the RRC signaling, the UE may subtract excess bits.

In one aspect, the excess bits may be subtracted from one particular field. For example, the excess bits may be subtracted from the FDRA field.

In another aspect, the excess bits may be sequentially subtracted from a predetermined number of specific fields, and may be subtracted by 1 bit from an MSB of each field. For example, the excess bits are sequentially subtracted from the FDRA field and a TDRA field, and may be subtracted from the MSB of each field.

It may be configured not to reduce a specific field to a preconfigured minimum length or less when the UE subtracts the excess bits from the specific field. That is, the UE subtracts the excess bits from a first field, but, when the length of the first field is reduced to the minimum length, the length of a subsequent second field is reduced.

The method of adjusting the length of the compact DCI by the UE according to the embodiment may be performed by the processor 110 of FIG. 11.

According to the present embodiment, the length of a DCI format that may be monitored by the UE is determined according to the length of the Release 15 DCI format.

Therefore, there is a disadvantage that the compact DCI cannot be made shorter than the Release 15 DCI format.

As another embodiment to solve this problem, the UE first adjusts the sizes of Release 15 DCI formats. If the Release 15 DCI formats have three lengths, and the length of the compact DCI is different from the lengths of the Release 15 DCI formats, the UE may adjust the length of the DCI format according to the following procedure. First, the UE matches the lengths of the non-fallback DCI (DCI format 0_1) for scheduling of the PUSCH and the non-fallback DCI (DCI format 1_1) for scheduling of the PDSCH to be the same. Here, a DCI format having a short length is padded with 0 so as to be matched to a DCI format having a long length. In this way, by matching the length of the non-fallback DCI and not matching the length of the compact DCI, the compact DCI having a short length may be configured and used.

When it is assumed that the fifth operation is not performed, an embodiment that can be modified is as follows. The UE first adjusts the sizes of Release 15 DCI formats. If the length of the compact DCI configured for the UE is different from the DCI lengths of the Release 15 DCI formats, and the total lengths exceed three lengths, the UE performs the fifth operation. That is, the UE matches the length of the fallback DCI (DCI formats 0_0 and 1_0) in the UE-specific search space to the length of the fallback DCI (DCI formats 0_0 and 1_0) in the common search space. Thereafter, if the lengths of the DCI formats still exceed three lengths, the UE may again perform the method of determining the DCI length according to the aforementioned first to fifth operations.

As another example of the present disclosure, the UE may receive DCI formats with different lengths in each slot. A specific embodiment for this includes checking the lengths of up to three DCI formats for each slot by the UE. The UE may not monitor a DCI format in a specific slot according to a period of the search space. In this case, the UE may determine whether there are more than up to three types of lengths, by using only the lengths of DCI formats that are monitored, except for a DCI format that is not monitored. If there are more than up to three types of lengths in the slot, the UE may adjust the length of the DCI format according to the aforementioned embodiment. In other slots, since the number of the lengths of the DCI format is three or fewer, the length of the DCI format may not be separately adjusted.

The method and system of the present disclosure are described in relation to specific embodiments, but configuration elements, a part of or the entirety of operations of the present disclosure may be implemented using a computer system having general purpose hardware architecture.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as a single type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

The invention claimed is:

1. A method for transmitting a physical uplink control channel (PUCCH) by a user equipment (UE) in a wireless communication system, the method comprising:
  receiving two or more physical downlink control channels (PDCCHs), wherein each PDCCH includes:
    a time-domain resource allocation for a corresponding physical downlink shared channel (PDSCH), and
    an indicator related to hybrid automatic repeat and request acknowledgement (HARQ-ACK) multiplexing, the indicator having one of 0 or 1;
  receiving two or more PDSCHs, each PDSCH corresponding to a respective one of the two or more PDCCHs;
  as for the two or more PDSCHs, generating a first HARQ-ACK codebook associated with a first value of the indicator, and generating a second HARQ-ACK codebook associated with a second value of the indicator; and
  based on a first PUCCH for the first HARQ-ACK codebook being overlapped with a second PUCCH for the second HARQ-ACK codebook, transmitting only one PUCCH among the first PUCCH and the second PUCCH, associated with a pre-determined value of the indicator.

2. The method of claim 1,
  wherein, based on the first PUCCH for the first HARQ-ACK codebook not being overlapped with the second PUCCH for the second HARQ-ACK codebook, the first and second PUCCHs are transmitted in a same slot.

3. The method of claim 2,
  wherein the first HARQ-ACK codebook is generated in a semi-static scheme, and the second HARQ-ACK codebook is generated in a dynamic scheme.

4. The method of claim 1,
  wherein, based on each PDCCH including the indicator, each PDCCH further includes an interval between a reception timing of the corresponding PDSCH and a transmission timing of a corresponding PUCCH, and the interval is defined in units of a sub-slot.

5. The method of claim 4,
  wherein the sub-slot is half of a slot.

6. A method for receiving a physical uplink control channel (PUCCH) by a base station (BS) in a wireless communication system, the method comprising:
  transmitting two or more physical downlink control channels (PDCCHs), wherein each PDCCH includes:
    a time-domain resource allocation for a corresponding physical downlink shared channel (PDSCH), and
    an indicator related to hybrid automatic repeat and request acknowledgement (HARQ-ACK) multiplexing, the indicator having one of 0 or 1;
  transmitting two or more PDSCHs, each PDSCH corresponding to a respective one of the two or more PDCCHs; and
  based on a first PUCCH for a first HARQ-ACK codebook being overlapped with a second PUCCH for a second HARQ-ACK codebook, receiving only one PUCCH among the first PUCCH and the second PUCCH, associated with a pre-determined value of the indicator,
  wherein, as for the two or more PDSCHs, the first HARQ-ACK codebook is provided in association with a first value of the indicator, and the second HARQ-ACK codebook is provided in association with a second value of the indicator.

7. The method of claim 6,
wherein, based on the first PUCCH for the first HARQ-ACK codebook not being overlapped with the second PUCCH for the second HARQ-ACK codebook, the first and second PUCCHs are received in a same slot.

8. The method of claim 7,
wherein the first HARQ-ACK codebook is generated in a semi-static scheme, and the second HARQ-ACK codebook is generated in a dynamic scheme.

9. The method of claim 6,
wherein, based on each PDCCH including the indicator, each PDCCH further includes an interval between a transmission timing of the corresponding PDSCH and a reception timing of the corresponding PUCCH, and the interval is defined in units of a sub-slot.

10. The method of claim 9,
wherein the sub-slot is half of a slot.

11. A user equipment (UE) for use in a wireless communication system, the UE comprising:
a communication module; and
a processor configured to control the communication module,
wherein the processor is configured to:
receive two or more physical downlink control channels (PDCCHs), wherein each PDCCH includes:
a time-domain resource allocation for a corresponding physical downlink shared channel (PDSCH), and
an indicator related to hybrid automatic repeat and request acknowledgement (HARQ-ACK) multiplexing, the indicator having one of 0 or 1;
receive two or more PDSCHs, each PDSCH corresponding to a respective one of the two or more PDCCHs;
as for the two or more PDSCHs, generate a first HARQ-ACK codebook associated with a first value of the indicator, and generate a second HARQ-ACK codebook associated with a second value of the indicator; and
based on a first physical uplink control channel (PUCCH) for the first HARQ-ACK codebook being overlapped with a second PUCCH for the second HARQ-ACK codebook, transmit only one PUCCH among the first PUCCH and the second PUCCH, associated with a pre-determined value of the indicator.

12. The UE of claim 11,
wherein, based on the first PUCCH for the first HARQ-ACK codebook not being overlapped with the second PUCCH for the second HARQ-ACK codebook, the first and second PUCCHs are transmitted in a same slot.

13. The UE of claim 12,
wherein the first HARQ-ACK codebook is generated in a semi-static scheme, and the second HARQ-ACK codebook is generated in a dynamic scheme.

14. The UE of claim 11,
wherein, based on each PDCCH including the indicator, each PDCCH further includes an interval between a reception timing of the corresponding PDSCH and a transmission timing of a corresponding PUCCH, and the interval is defined in units of a sub-slot.

15. The UE of claim 14,
wherein the sub-slot is half of a slot.

16. A base station (BS) for use in a wireless communication system, the BS comprising:
a communication module; and
a processor configured to control the communication module,
wherein the processor is configured to:
transmit two or more physical downlink control channels (PDCCHs), wherein each PDCCH includes:
a time-domain resource allocation for a corresponding physical downlink shared channel (PDSCH), and
an indicator related to hybrid automatic repeat and request acknowledgement (HARQ-ACK) multiplexing, the indicator having one of 0 or 1;
transmit two or more PDSCHs, each PDSCH corresponding to a respective one of the two or more PDCCHs; and
based on a first physical uplink control channel (PUCCH) for a first HARQ-ACK codebook being overlapped with a second PUCCH for a second HARQ-ACK codebook, receive only one PUCCH among the first PUCCH and the second PUCCH, associated with a pre-determined value of the indicator,
wherein, as for the two or more PDSCHs, the first HARQ-ACK codebook is provided in association with a first value of the indicator, and the second HARQ-ACK codebook is provided in association with a second value of the indicator.

17. The BS of claim 16,
wherein, based on the first PUCCH for the first HARQ-ACK codebook not being overlapped with the second PUCCH for the second HARQ-ACK codebook, the first and second PUCCHs are received in a same slot.

18. The BS of claim 17,
wherein the first HARQ-ACK codebook is generated in a semi-static scheme, and the second HARQ-ACK codebook is generated in a dynamic scheme.

19. The BS of claim 16,
wherein, based on each PDCCH including the indicator, each PDCCH further includes an interval between a transmission timing of the corresponding PDSCH and a reception timing of the corresponding PUCCH, and the interval is defined in units of a sub-slot.

20. The BS of claim 19,
wherein the sub-slot is half of a slot.

* * * * *